US007263257B2

(12) United States Patent
Sugden et al.

(10) Patent No.: US 7,263,257 B2
(45) Date of Patent: Aug. 28, 2007

(54) GIRES-TOURNOIS ETALONS AND DISPERSION COMPENSATION

(75) Inventors: Catherine Anne Sugden, Birmingham (GB); Xuewen Shu, Birmingham (GB); Lee Ann Kennedy, Birmingham (GB); Kevin Christopher Byron, Bishop Stortford (GB)

(73) Assignee: Aston University, Birmingham (GB)

( * ) Notice: Subject to any disclaimer, the term of this patent is extended or adjusted under 35 U.S.C. 154(b) by 168 days.

(21) Appl. No.: 10/291,898

(22) Filed: Nov. 8, 2002

(65) Prior Publication Data

US 2003/0210864 A1    Nov. 13, 2003

(30) Foreign Application Priority Data

May 13, 2002   (GB)  ................................. 0210899.1

(51) Int. Cl.
*G02B 6/34* (2006.01)
*G02F 1/01* (2006.01)

(52) U.S. Cl. ............................... 385/37; 385/1; 385/31; 385/39; 385/129

(58) Field of Classification Search ................ 385/37, 385/10–12, 24, 39, 31, 4–5, 15, 27, 47–50; 372/6; 359/173, 117, 124, 161, 140, 238, 359/298, 337.5, 338–339, 346, 566, 568–576
See application file for complete search history.

(56) References Cited

U.S. PATENT DOCUMENTS 5,361,130 A * 11/1994 Kersey et al. ............... 356/478

(Continued)

FOREIGN PATENT DOCUMENTS

JP    10 319265 A    12/1998

(Continued)

OTHER PUBLICATIONS

Shu et al ("Tunable Dispersion Compensator Based on Distributed Gires-Tournois Etalons", IEEE Photonics Technology Letters, vol. 15, No. 8, Aug. 2003, pp. 1111-1113).*

(Continued)

*Primary Examiner*—Frank G. Font
*Assistant Examiner*—Ryan Lepisto
(74) *Attorney, Agent, or Firm*—Kenyon & Kenyon LLP

(57) ABSTRACT

A first embodiment of the invention provides a Gires-Tournois etalon (DGTE) 20 comprising a cladding mode suppressed optical fibre 22, including an etalon section 24 in which a weakly reflective optical waveguide grating 26 and a strongly reflective optical waveguide grating 28 are provided. The two gratings 26, 28 are chirped fibre Bragg gratings (FBGs). The chirped FBGs 26, 28 are arranged to together define an etalon cavity. Another aspect of the invention provides a dispersion compensator 60 comprising two DGTEs 62, 64 according to the first embodiment of the invention. The DGTEs 62, 64 have a linearly varying dispersion over a selected optical bandwidth. The first DGTE 62 has a positive dispersion slope and the second DGTE 64 has a negative dispersion slope. The magnitudes of the dispersion slopes of the two DGTEs 62, 64 are substantially equal, so that the dispersion compensator 60 has a constant dispersion across the selected bandwidth. The DGTEs 62, 64 are optically coupled to one another via a four-port optical circulator 66.

32 Claims, 18 Drawing Sheets

U.S. PATENT DOCUMENTS

| | | | |
|---|---|---|---|
| 5,647,038 A * | 7/1997 | Minden et al. | 385/37 |
| 5,699,468 A | 12/1997 | Farries et al. | 385/140 |
| 6,147,788 A * | 11/2000 | Mamyshev et al. | 398/80 |
| 6,292,282 B1 * | 9/2001 | Mossberg et al. | 398/99 |
| 6,304,689 B1 * | 10/2001 | Dingel et al. | 385/24 |
| 6,317,539 B1 | 11/2001 | Loh et al. | 385/37 |
| 6,356,684 B1 * | 3/2002 | Patterson et al. | 385/37 |
| 6,381,069 B1 | 4/2002 | Riant et al. | 359/569 |
| 6,490,381 B1 * | 12/2002 | Adair et al. | 385/16 |
| 6,683,721 B2 * | 1/2004 | Copner et al. | 359/618 |
| 6,765,679 B2 * | 7/2004 | Ducellier et al. | 356/491 |
| 6,768,098 B1 * | 7/2004 | Sugden et al. | 250/227.19 |
| 6,822,217 B1 * | 11/2004 | Murgatroyd et al. | 250/227.14 |
| 2001/0021294 A1 * | 9/2001 | Cai et al. | 385/37 |
| 2002/0005970 A1 * | 1/2002 | Lang | 359/161 |
| 2002/0094165 A1 * | 7/2002 | Rothenberg | 385/37 |
| 2002/0126291 A1 * | 9/2002 | Qian et al. | 356/450 |
| 2002/0159691 A1 * | 10/2002 | Zenteno | 385/27 |
| 2002/0196549 A1 * | 12/2002 | Randall et al. | 359/578 |
| 2003/0021532 A1 * | 1/2003 | Painchaud | 385/37 |
| 2003/0053174 A1 * | 3/2003 | Rosenfeldt | 359/161 |
| 2003/0086168 A1 * | 5/2003 | Copner et al. | 359/484 |
| 2003/0210727 A1 * | 11/2003 | Frisken et al. | 372/92 |
| 2004/0101239 A1 * | 5/2004 | Parker | 385/37 |
| 2004/0101242 A1 * | 5/2004 | Zervas | 385/37 |

FOREIGN PATENT DOCUMENTS

WO          WO 01/22126 A1      3/2001

OTHER PUBLICATIONS

Shu et al ("Design and Realization of Dispersion Slope Compensators Using Distributed Gires-Tournois Etalons", IEEE Photonics Technology Letters, vol. 16, No. 4, Apr. 2004, pp. 1092-1094).*

Shu et al ("All-fiber Michelson-Gires-Tournois Interferometer as Multi-passband Filter", IEEE LTIMC, Oct. 20, 2004, pp. 144-147).*

Miao Yang et al., "Electro-optic Michelson-Gires Tournois modulator for optical information processing and optical fiber communications," *Opt. Lett. (USA), Optics Letters*, Opt. Society of America, USA, vol. 24, No. 17, Sep. 1, 1999, pp. 1239-1241.

*Patent Abstracts of Japan*, vol. 1999, No. 3, Mar. 31, 1999 (JP 10 319265 A).

Othonos et al., "Superimposed Multiple Bragg Gratings," *Electronics Letters*, IEE Stevenage, GB, vol. 30, No. 23, Nov. 10, 1994), pp. 1972-1974.

Everall et al., "Fabrication of multipassband móire resonators in fibers by the dual-phase-mask exposure method," *Optics Letters*, vol. 22, No. 19, Oct. 1, 1997, pp. 1473-1475.

Chen et al., "A novel simple measurement technique of equivalent chirp in the grating period of sampled Bragg grating," *Optics Communications*, vol. 201, No. 1-3, Jan. 1, 2002, pp. 5-9.

Xie et al., "Tunable Compensation of the Dispersion Slope Mismatch in Dispersion-Managed Systems Using a Samples Nonlinearly-Chirped FBG," *Optical Fiber Communication Conference, Technical Digest Postconference Edition Rends in Optics and Photonics.*, pp. 271-273, vol. 3, 2000.

Chen et al., "Fibre Bragg-grating transmission filters with near ideal filter response," *Electronics Letters*, Oct. 15, 1998, vol. 34, No. 21, pp. 2048-2050.

Xie et al., "Tunable Compensation of the Dispersion Slope Mismatch in Dispersion-Managed Systems Using a Samples Nonlinearly-Chirped FBG," *IEEE Photonics Technology Letters*, vol. 12, No. 10, Oct. 2000, pp. 1417-1419.

Azana et al., "Superimposed in-fiber grating structures for optical signal processing in wavelength division-multiplexing systems," *Optical Fiber Communication Conference, Technical Digest Postconference Edition. Rends in Optics and Photonics*, pp. 233-235, vol. 2, 2000.

Doucet et al., "High-finesse large band Fabry-Perot fibre filter with superimposed chirped Bragg gratings," *Electronics Letters*, Apr. 25, 2002, vol. 38, No. 9, pp. 402-403.

Chen et al., "Transmission Filters with Multiple Flattened Passbands Based on Chirped Moire Gratings," *IEEE Photonics Technology Letters*, vol. 10, No. 9, Sep. 1, 1998, pp. 1283-1285.

Ibsen et al., "Chirped moire fiber gratings operating on two-wavelength channels for use a dual-channel dispersion compensators," *IEEE Photonics Technology Letters*, Jan. 1998, vol. 10, No. 1, pp. 84-86.

Town et al., "Wide-band Fabry-Perot-like filters in Optical Fiber," *IEEE Photonics Technology Letters*, vol. 7, No. 1, 1995, pp. 78-80.

Azana et al., "Real-time Fourier Transformations performed simultaneously over-multiwavelength signals," *IEEE Photonics Technology Letters*, Jan. 2001, vol. 13, No. 1, pp. 55-57.

Loh et al., "Sampled Fiber Grating Based Dispersion Slope Compensator," *IEEE Photonics Technology Letters*, vol. 11, No. 10, Oct. 1999, pp. 1280-1282.

*Patent Abstracts of Japan*, vol. 1998, No. 14, Dec. 31, 1998 (JP 10 256633 A).

\* cited by examiner

R (dB)

Δτ (ps)

D (ps/nm)

GIRES-TOURNOIS ETALONS AND DISPERSION COMPENSATION

The invention relates to Gires-Tournois etalons and to dispersion compensators incorporating them.

Dispersion is a major problem for optical transmission systems. As pulses of light travel down an optical fibre transmission line they broaden due to chromatic dispersion. In addition, due to dispersion slope, the dispersion experienced by each wavelength component of an optical pulse can be different. The dispersion acquired by an optical pulse limits the length of transmission line across which a data signal (made up of a series of optical pulses) can be transmitted and successfully decoded at the receiver. Tuneable dispersion compensators are becoming key devices in high speed optical transmission systems due to dispersion tolerances rapidly being reduced with increasing bit rate, especially when the bit rate reaches 40 Gbit/s or beyond. Dynamic control of dispersion is also demanded during reconfiguration of transmission networks to compensate for effects such as the change of the link lengths or introduction of wavelength dependent routing A number of solutions have been proposed to address the problem of dispersion. The majority of these perform dispersion compensation on the pulses. This involves reforming the optical pulses to their original shape so that the data signal can then either be decoded or retransmitted across another transmission line.

One known dispersion compensation method utilises negative dispersion optical fibre (DCF) to reverse the effects of dispersion in normal transmission fibre. Although this works well as a bulk dispersion compensator (all channels), the amount of compensation applied cannot be adjusted and it does not compensate for higher-order dispersion terms (e.g. dispersion slope). Another solution uses chirped fibre Bragg gratings (CFBG), the different wavelengths of light being reflected from different positions along the grating, thereby applying a negative dispersion to the pulse. CFBG based devices are long (of the order of 10 cm), making them difficult and expensive to fabricate and package, and they can suffer from high delay ripple effects (10-20 ps). A third approach is based on complex fibre Bragg gratings having a grating structure which includes multiple phase shifts and complex amplitude functions. However, these devices are primarily used only for dispersion slope compensation, and due to their fabrication complexity they suffer from low yields.

Various dispersion tuneable devices based on tuneable chirped fibre Bragg gratings, virtually imaged phased arrays, and integrated optical filters have been demonstrated. Although chirped fibre Bragg grating based devices are low loss and fully compatibility with optical fibre, they can generally only be used to provide compensation on a single optical channel.

An alternative arrangement to optical fibre based dispersion compensation devices is based on thin-film Gires-Tournois etalons (GTE). These bulk optic devices rely on reflections from a thin film etalon cavity to induce a negative dispersion effect on an optical pulse. However, they can only apply identical dispersion across their whole operating bandwidth. In addition, bulk optic GTE based devices suffer from high insertion losses due to the optical signal having to exit and renter the transmission fibre.

According to a first aspect of the present invention there is provided a Gires-Tournois etalon comprising:

an optical waveguide including a grating section in which an optical waveguide grating is provided; and an optical reflector optically coupled to the optical waveguide, the optical waveguide grating and the optical reflector being arranged to together define an etalon cavity.

The optical reflector preferably comprises a second optical waveguide grating provided within a second grating section of the optical waveguide, at least part of the spectral profile of each grating including the same wavelength range. The optical waveguide grating is preferably a weakly reflective optical waveguide grating and the second optical waveguide grating is preferably a strongly reflective optical waveguide grating.

The Gires-Tournois etalon may further comprise one or more additional optical waveguide gratings of intermediate reflective strength, giving a total of n optical waveguide gratings, at least part of the spectral profile of each additional grating including the same wavelength range as the spectral profiles of the weakly reflective grating and the strongly reflective grating, and the gratings being arranged to together define n−1 etalon cavities. The or each optical waveguide grating is preferably a Bragg grating.

The optical waveguide gratings may be arranged in a spaced relationship with one another or may be arranged abutting one another. The optical waveguide gratings may be uniform period Bragg gratings, chirped Bragg gratings, phase-shifted Bragg gratings or sampled Bragg gratings.

Alternatively, the optical waveguide gratings may be arranged such that they at least in part overlap one another. The optical waveguide gratings may be chirped Bragg gratings, phase-shifted Bragg gratings or sampled Bragg gratings.

The chirped Bragg gratings may have a linear chirp or a non-linear chirp, such as a quadratic chirp.

The optical waveguide gratings may each be the same type of Bragg grating, or may be different types of Bragg grating. Where two or more gratings are chirped Bragg gratings they may be chirped in the same direction or in different directions, and they may have the same rate of chirp or different rates of chirp.

The optical reflector may alternatively comprise a bulk-optic mirror. The optical reflector may further alternatively comprise a cleaved end face of the optical waveguide. The optical reflector may further alternatively comprise a photo-induced reflection point provided within the optical waveguide.

The Gires-Tournois etalon may further comprise one or more tuning means to which one or more of the optical waveguide gratings are coupled, the tuning means being operable to alter the periodicity of a grating, thereby changing the dispersion characteristics of the etalon. The tuning means may comprise apparatus for applying an axial force to a grating. The axial force may be an axial strain or an axial compression. The tuning means may alternatively comprise heating apparatus operable to heat a grating. The tuning means may further alternatively comprise apparatus operable to change the spectral profile of a grating by changing the effective refractive index of a material, surrounding at least part of the etalon section of the optical waveguide containing the grating, utilising the electro-optic effect or the magneto-optic effect.

The optical waveguide may be an optical fibre or may be a planar optical waveguide.

According to a second aspect of the present invention there is provided a Gires-Tournois etalon comprising:

an optical waveguide including an etalon section in which an optical waveguide grating structure is provided, the optical waveguide grating structure having a periodic refractive index variation equivalent to two or more at least partially overlapped complex Bragg gratings, a first one of the complex Bragg gratings being weakly reflective and a second one of the complex Bragg gratings being strongly reflective.

The complex Bragg gratings may be chirped Bragg gratings, phase-shifted Bragg gratings or sampled Bragg gratings. The complex Bragg gratings may each be the same type of Bragg grating, or may be different types of Bragg grating. Where two or more of the complex Bragg gratings are chirped Bragg gratings they may be chirped in the same direction or in different directions, and they may have the same rate of chirp or different rates of chirp.

The Gires-Tournois etalon may further comprise tuning means to which at least part of the optical waveguide grating structure is coupled, the tuning means being operable to alter the periodicity of the grating structure, thereby changing the dispersion characteristics of the etalon. The tuning means may comprise apparatus for applying an axial force to the grating structure. The axial force may be an axial strain or an axial compression. The tuning means may alternatively comprise heating apparatus operable to heat the grating structure. The tuning means may further alternatively comprise apparatus operable to change the spectral profile of the grating structure by changing the effective refractive index of a material, surrounding at least part of the etalon section of the optical waveguide, utilising the electro-optic effect or the magneto-optic effect.

The optical waveguide may be an optical fibre or may be a planar optical waveguide.

According to a third aspect of the present invention there is provided a dispersion controller comprising:

a first Gires-Tournois etalon according to the first or second aspect of the present invention, wherein an optical pulse propagating through the waveguide interacts with the etalon, the distance each wavelength component of the pulse travels before exiting the etalon varying with wavelength, such that a wavelength dependent delay is applied to each wavelength component, thereby applying dispersion to the pulse.

The dispersion compensator may further comprise a second Gires-Tournois etalon according to the first or second aspect of the invention optically coupled to the first Gires-Tournois etalon. The first and second etalons may be optically coupled together via an optical waveguide coupler or an optical waveguide circulator.

The first and second Gires-Tournois etalons may apply the same or different dispersions to an optical pulse propagating through the dispersion compensator. The first and second etalons preferably apply dispersion slopes of substantially equal magnitude and opposite sign to the pulse, the first and second etalons thereby together applying a non-zero dispersion and a substantially zero dispersion slope to the pulse.

The dispersion compensator may further comprise one or more additional Gires-Tournois etalons according to the first or second aspects of the invention, the etalons being optically coupled together via one or more optical waveguide couplers or optical waveguide circulators.

According to a fourth aspect of the present invention there is provided a dispersion slope compensator comprising:

a Gires-Tournois etalon according to the first aspect of the present invention, the reflectivity of the weak optical waveguide grating varying across the operational bandwidth of the Gires-Tournois etalon, thereby giving the etalon a dispersion profile across which the dispersion slope varies as function of wavelength.

The reflectivity of the weak optical waveguide grating may vary linearly or non-linearly as a function of wavelength.

According to a fifth aspect of the present invention there is provided a dispersion compensator comprising:

a first optical waveguide including a first etalon section in which first and second optical waveguide gratings are provided, at least part of the spectral profile of each grating including the same wavelength range, and the gratings being arranged to together define a first etalon, wherein an optical pulse propagating through the waveguide interacts with the etalon, the distance each wavelength component of the pulse travels before exiting the etalon varying with wavelength, such that a wavelength dependent delay is applied to each wavelength component, thereby applying dispersion to the pulse.

The optical waveguide gratings are preferably Bragg gratings. The Bragg gratings may be uniform period Bragg gratings. Alternatively, the first grating may be a uniform period Bragg grating and the second grating may be a chirped Bragg grating. The chirped Bragg grating may have a linear chirp or may have a quadratic chirp.

Further alternatively, the first and second gratings may both be chirped Bragg gratings. The first and second chirped Bragg gratings may both have a linear chirp, and may have the same rate of chirp or different rates of chirp. Alternatively, the first and second chirped Bragg gratings may both have a non-linear chirp, such as a quadratic chirp. Further alternatively, one of the first and second chirped Bragg gratings may have a linear chirp and the other a non-linear chirp, such as a quadratic chirp. The first and second chirped Bragg gratings may be chirped in the same direction or in opposite directions.

The optical waveguide gratings are preferably short in length, and are most preferably between 1 millimetre and 20 millimetres in length.

The optical waveguide gratings are preferably arranged in a spaced relationship with one another, and are most preferably closely spaced. The gratings may alternatively be located adjacent to one another. The gratings may further alternatively be arranged such that they at least in part overlap one another.

The dispersion compensator may further comprise a second optical waveguide including a second etalon section in which third and fourth optical waveguide gratings are provided, at least part of the spectral profile of each grating including the same wavelength range, and the gratings being arranged to together define a second etalon, wherein the optical pulse propagating through the waveguide interacts with the second etalon, the distance each wavelength component of the pulse travels before exiting the second etalon varying with wavelength, such that a wavelength dependent delay is applied to each wavelength component, thereby applying dispersion to the pulse.

The first and second etalons may apply the same or different dispersions to the pulse. The first and second etalons preferably apply dispersion slopes of substantially equal magnitude and opposite sign to the pulse, the first and second etalons thereby together applying a non-zero dispersion and a substantially zero dispersion slope to the pulse.

The dispersion compensator may alternatively or additionally further comprise a bulk-optic Gires-Tournois etalon optically coupled to the first optical waveguide. The dispersion compensator may further alternatively or additionally further comprise a further optical waveguide Bragg grating, which is preferably a chirped Bragg grating.

The dispersion compensator preferably further comprises tuning means to which one or both gratings of the or each etalon are coupled, the tuning means being operable to alter the periodicity of a grating, thereby changing the dispersion which may be applied to the pulse by the respective etalon. The tuning means may comprise apparatus for applying an axial force to the grating The axial force may be an axial strain or an axial compression. The tuning means may alternatively comprise heating apparatus operable to heat the grating. The tuning means may further alternatively comprise apparatus for change the spectral profile of the grating by changing the effective refractive index of a material surrounding the part of the etalon section of the optical waveguide containing the grating, utilising the electro-optic effect or the magneto-optic effect.

The dispersion compensator may additionally comprise an optical waveguide circulator or an optical waveguide coupler, the circulator or coupler preceding, as seen by an optical pulse, the or each etalon, to thereby enable the compensator to be used in reflection.

The or each optical waveguide is preferably an optical fibre, or may alternatively be a planar optical waveguide.

Specific embodiments of the invention will now be described in detail, by way of example only, with reference to the accompanying drawings, in which.

Figure 38:
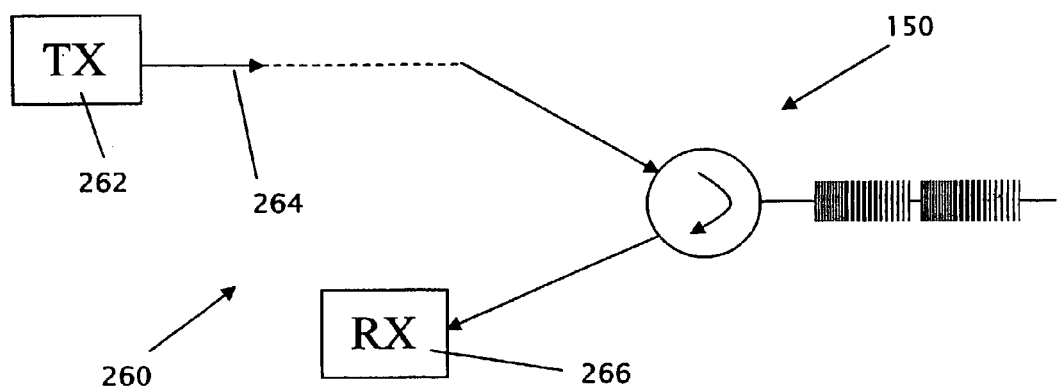
Figure 39:
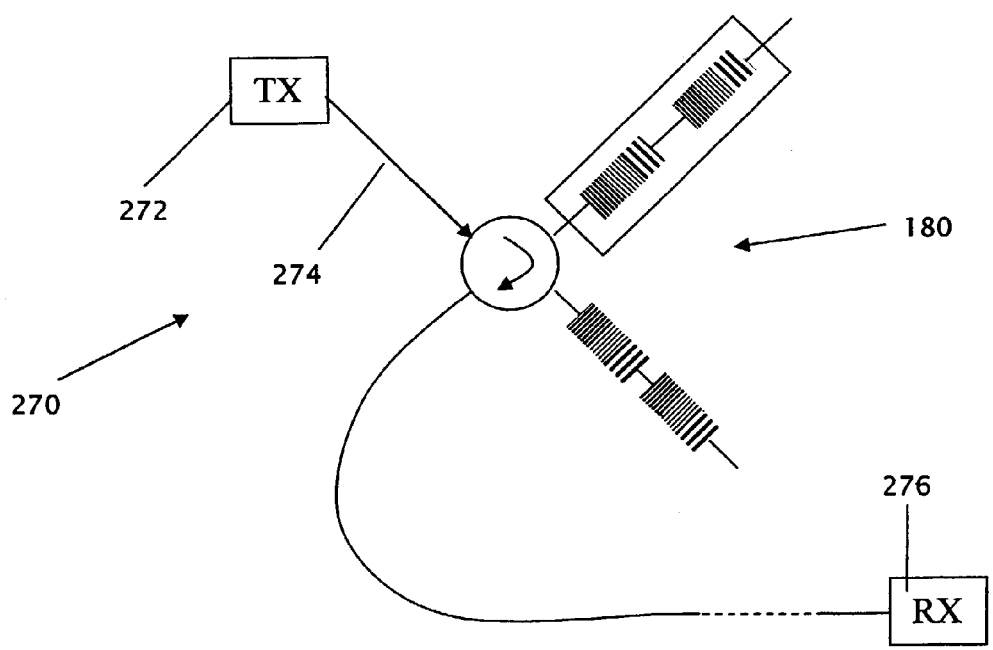

FIG. 38 is a diagrammatic representation of an optical transmission system including an optical compensator according to the present invention being used to apply post-transmission compensation to an optical signal; and FIG. 39 is a diagrammatic representation of an optical transmission system including an optical compensator according to the present invention being used to apply pre-transmission compensation to an optical signal.

Figure 1:
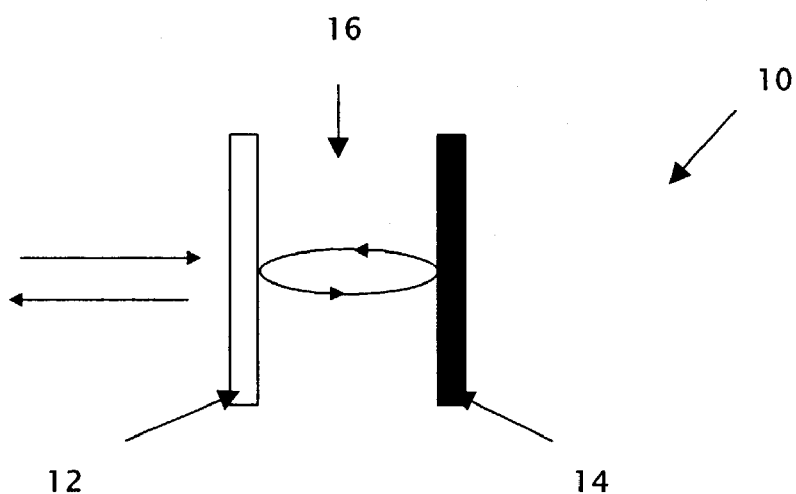
FIG. 1 is a diagrammatic representation of a prior art bulk-optic Gires-Tournois etalon.

Referring to FIG. 1, the traditional bulk-optic Gires-Tournois etalon 10 is a special configuration of a Fabry-Perot etalon, and consists of a partially reflective first mirror 12 and a 100% reflective second mirror 14 which together define the etalon cavity 16. The second mirror 14 reflects all light incident on it to yield the all-pass transfer function of the Gires-Tournois etalon 10. The spectral characteristics of the first mirror 12 can be altered to control the dispersion properties of the Gires-Tournois etalon 10.

Figure 2:
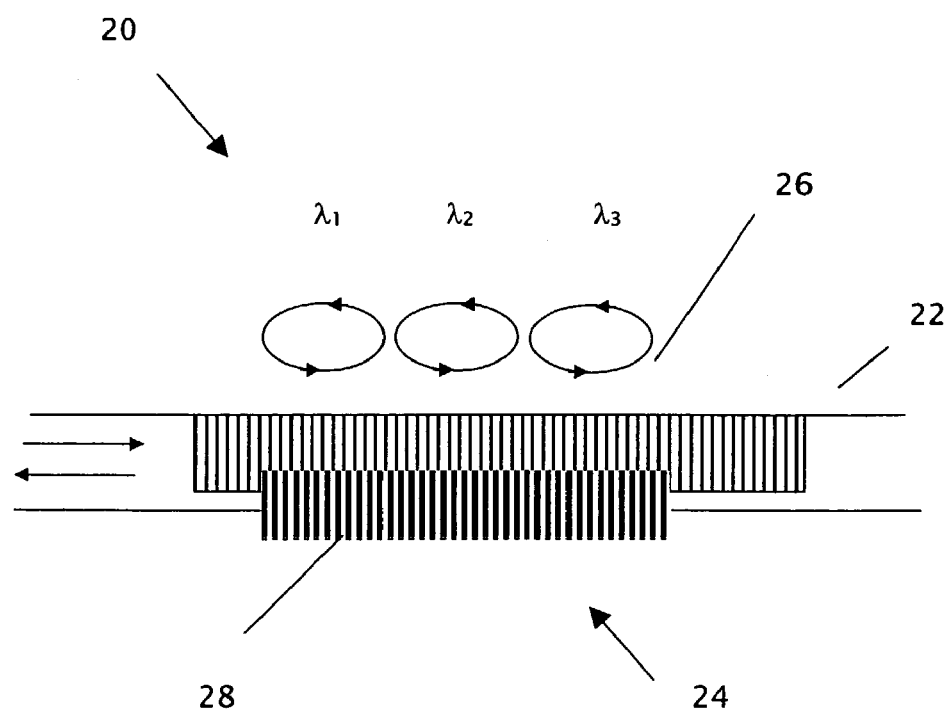
FIG. 2 is a diagrammatic representation of a Gires-Tournois etalon according to a first embodiment of the invention.

FIG. 2 shows a Gires-Tournois etalon (GTE) 20 according to a first embodiment of the invention. The GTEs described hereinafter are referred to as distributed GTEs (DGTE) in order to emphasise the physical property of these GTEs that the resonance location within the etalon cavity is wavelength dependent. The DGTE 20 in this example comprises an optical waveguide, in the form of cladding mode suppressed optical fibre 22, including an etalon section 24 in which a weakly reflective optical waveguide grating 26 and a strongly reflective optical waveguide grating 28 are provided. In this example the weakly reflective optical waveguide grating 26 is a partially reflective (~11%) chirped fibre Bragg grating (FBG) and the strongly reflective grating 28 is a strong (~99%) chirped FBG. The weak grating 26 has a length of 6 mm, a bandwidth of ~10 nm and a central wavelength of 1550 nm. The strong grating 28 has a length of 10 mm, a bandwidth of ~18 nm and a central wavelength of 1550 nm. The two chirped FBGs 26, 28 have the same chirp rates. The two chirped FBGs 26, 28 were written into the optical fibre 22 using the phase-mask fabrication process. A frequency doubled argon ion laser was used to write the chirped FBGs 26, 28 and they were apodised with a super-Gaussian profile during the writing process. This method of fabricating gratings will be well know to the person skilled in the art so it will not be described in detail here.

Figure 3:
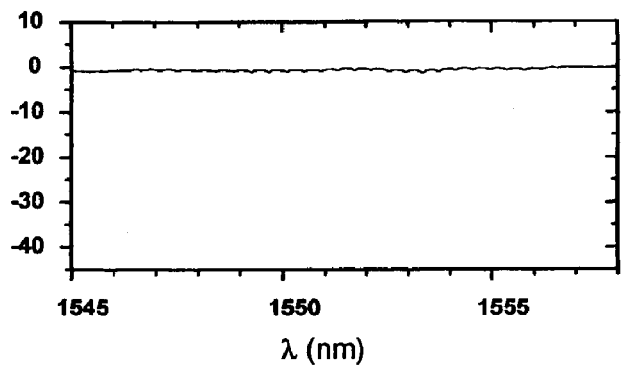
FIG. 3 shows the experimentally recorded spectral profile in reflection (R) of the Gires-Tournois etalon of FIG. 2.

The two chirped FBGs 26, 28 are arranged to together define an etalon cavity. In this example the FBGs 26, 28 overlap one another, with their centres being off-set from one another by approximately 2 mm. This separation gives the DGTE 20 a channel spacing (free spectral range) of 50 GHz. The spectral profile in reflection (R) of the DGTE 20 is shown in FIG. 3. As can be seen, the reflectivity of the DGTE 20 is high and the fluctuation in the reflectivity is less than 1 dB.

Figure 4:
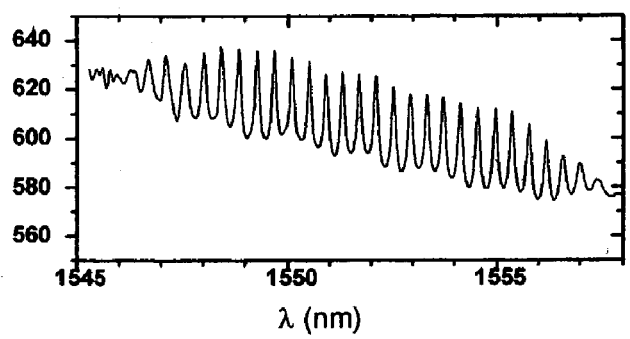
FIG. 4 shows the experimentally recorded group delay ($\Delta\tau$) profile of the Gires-Tournois etalon of FIG. 2.
Figure 5:
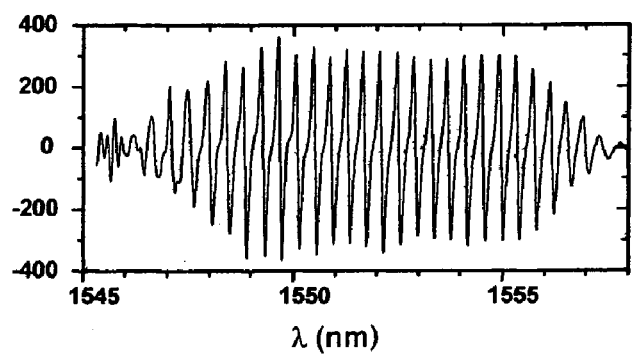
FIG. 5 shows the experimentally recorded dispersion (D) profile of the Gires-Tournois etalon of FIG. 2.

The group delay ($\Delta\tau$) profile of the DGTE 20 is shown in FIG. 4, from which the periodic response of the DGTE 20 is clearly evident. In fact the group delay is periodically quasi-quadratic. In addition, the group delay can be clearly seen to have a slope. This is caused by the dispersive nature of the chirped FBGs 26, 28. The dispersion (D) profile of the DGTE 20 is shown in FIG. 5. The dispersion of the DGTE 20 can be seen to be periodically quasi-linear within a given bandwidth i.e. for each channel. Good linearity in the dispersion can be achieved by controlling the reflectivity of the weak grating 16; essentially, lower reflectivity results in better dispersion linearity.

As can be seen from FIGS. 4 and 5, the usable bandwidth of the DGTE 20 is about 8 nm. This is mainly determined by the spectral characteristics of the weak grating 26. The bandwidth of the DGTE 20 can be easily expanded to cover the whole telecoms C-band, or even wider, by using longer gratings or by giving the gratings a larger chirp rate.

Despite the differences in its spectral characteristics, namely the limited bandwidth and the slope present on the group delay profile, the DGTE 20 according to the present invention clearly exhibits similar periodic characteristics to traditional bulk-optic GTEs.

Figure 6:
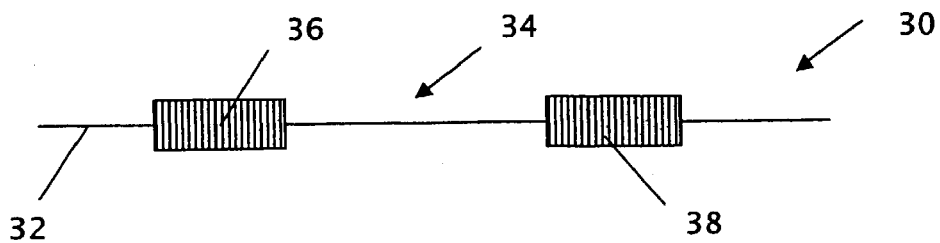
FIG. 6 is a diagrammatic representation of a Gires-Tournois etalon according to a second embodiment of the invention.

A DGTE 30 according to a second embodiment of the invention is shown in FIG. 6. In this example the DGTE 30 comprises an optical waveguide, in the form of cladding mode suppressed optical fibre 32, including an etalon section 34 in which a weakly reflective optical waveguide grating 36 and a strongly reflective optical waveguide grating 38 are provided. In this example, both the weak grating 36 and the strong grating 38 are uniform period FBGs. The weak grating 36 has length of ~0.2 mm and the strong grating has a length of ~0.8 mm. Both gratings 36, 38 have a central wavelength of ~1546.1 nm and a bandwidth of ~1.9 nm. The gratings 36, 38 are arranged in a spaced relationship with one another, with a separation distance between the grating centres of ~4.1 mm.

Figure 7:
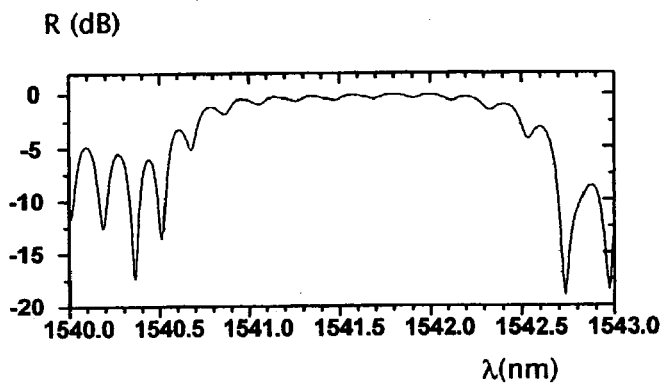
FIG. 7 shows the experimentally recorded spectral profile in reflection (R) of the Gires-Tournois etalon of FIG. 6.
Figure 8:
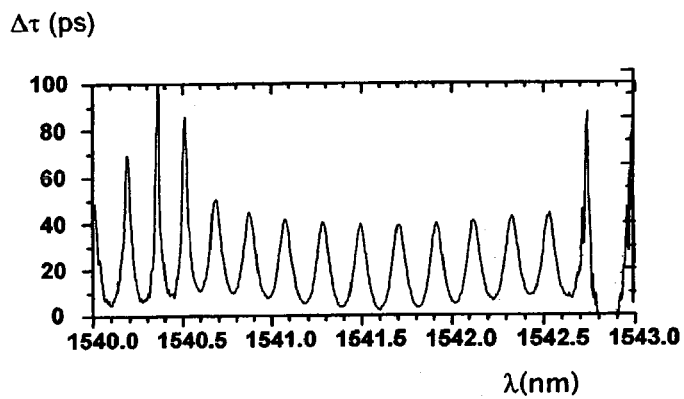
FIG. 8 shows the experimentally recorded group delay ($\Delta\tau$) profile of the Gires-Tournois etalon of FIG. 6.
Figure 9:
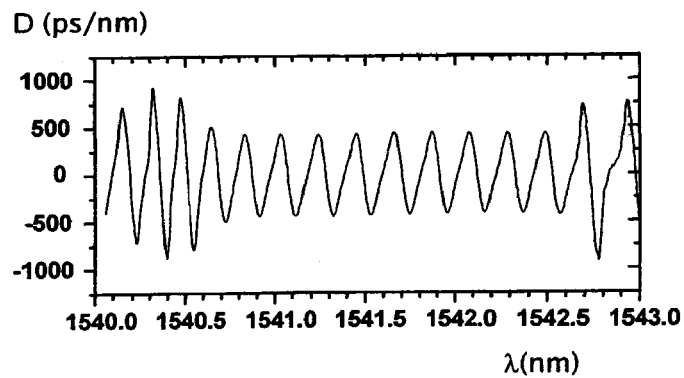
FIG. 9 shows the experimentally recorded dispersion (D) profile of the Gires-Tournois etalon of FIG. 6.

The spectral profile in reflection (R) of the DGTE 30 is shown in FIG. 7. The group delay ($\Delta\tau$) profile and the dispersion profile of the DGTE 30 are shown in FIGS. 8 and 9 respectively.

Figure 10:
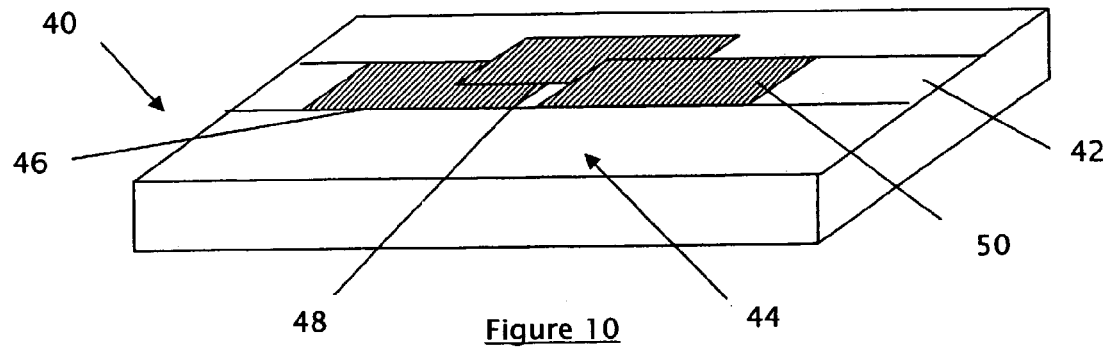
FIG. 10 is a diagrammatic representation of a Gires-Tournois etalon according to a third embodiment of the invention.

The usable bandwidth of a DGTE and the amount of dispersion for each channel which it can apply to an optical signal can both be increased by increasing the number of etalon cavities within the DGTE. FIG. 10 shows a DGTE 40 according to a third embodiment of the invention. In this embodiment, the DGTE 40 comprises a planar optical waveguide 42, including an etalon section 44 in which three chirped FBGs are provided: a weak grating 46 having a reflectivity of 0.8%; an intermediate strength grating 48 having a reflectivity of 23.6%; and a strong grating 50 having a reflectivity of 50%.

Each grating has a length of 8 mm and a bandwidth of ~13.6 nm. The gratings are arranged to overlap one another, with the centres of adjacent gratings being offset by ~1 mm. The intermediate grating 48 is shown offset for clarity, but it will be appreciated that the three FBGs are in fact co-linear with one another. The three gratings 46, 48, 50 together define two etalon cavities, each cavity having a length of ~1 mm.

Figure 11:
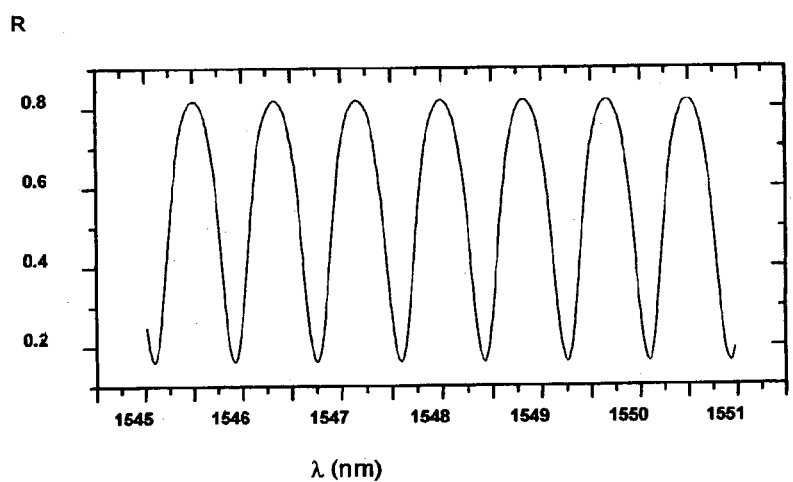
FIG. 11 shows the theoretically modelled spectral profile in reflection (R) of the Gires-Tournois etalon of FIG. 10.
Figure 12:
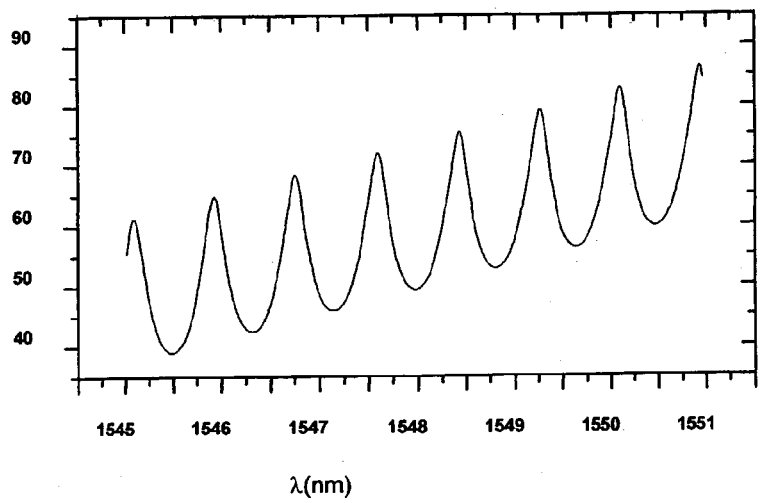
FIG. 12 shows the theoretically modelled group delay ($\Delta\tau$) profile of the Gires-Tournois etalon of FIG. 10.
Figure 13:
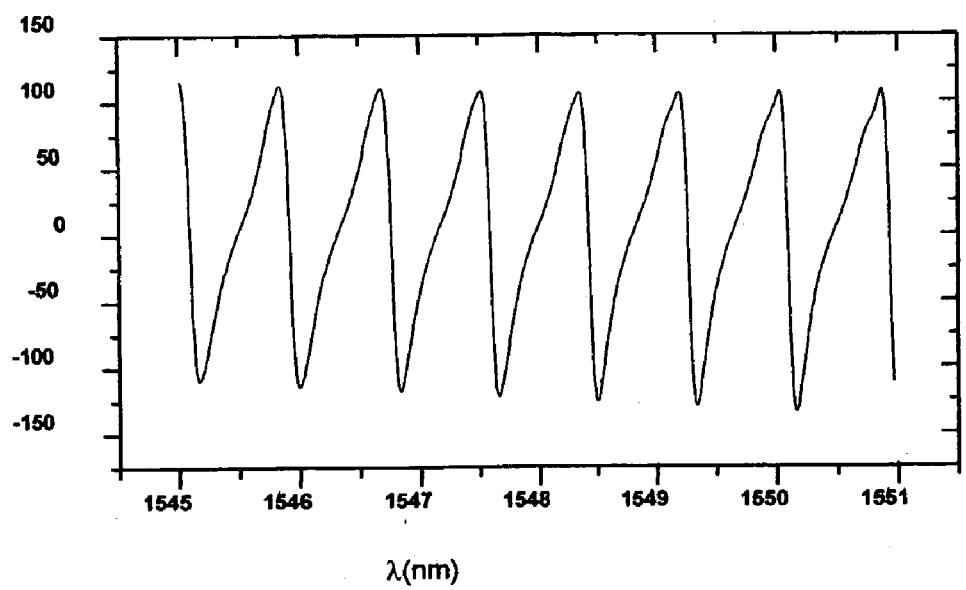
FIG. 13 shows the theoretically modelled dispersion (D) profile of the Gires-Tournois etalon of FIG. 10.

FIGS. 11 to 13 show the spectral profile in reflection (R), the group delay ($\square\square$) profile, and the dispersion (D) profile respectively of the DGTE 40.

A fourth embodiment of the invention provides a DGTE which comprises a single optical waveguide grating structure fabricated within a planar optical waveguide. The grating structure has a periodic refractive index variation which, in this example, is equivalent to two overlapped chirped Bragg gratings; one weak grating and one strong grating. The equivalent chirped Bragg gratings each have a length of 8 mm and a bandwidth of 13.6 nm.

Figure 14:
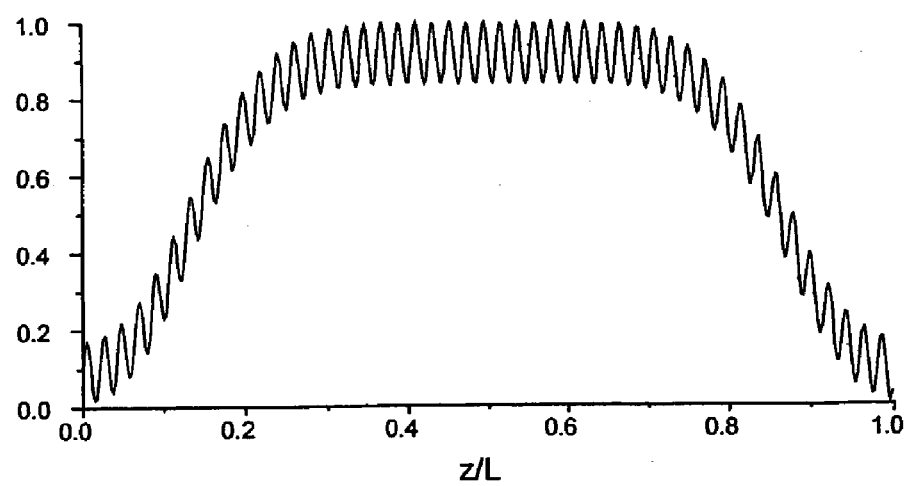
FIG. 14 shows the apodization function used to fabricated a Gires-Tournois etalon comprising a single grating structure according to a fourth embodiment of the invention.
Figure 15:
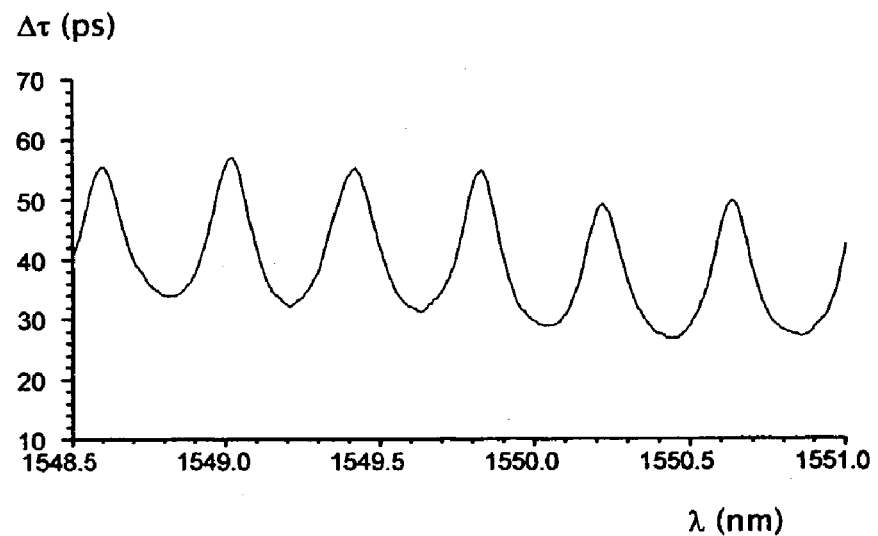
FIG. 15 shows the theoretically modelled group delay ($\Delta\tau$) profile of the Gires-Tournois etalon of FIG. 14.
Figure 16:
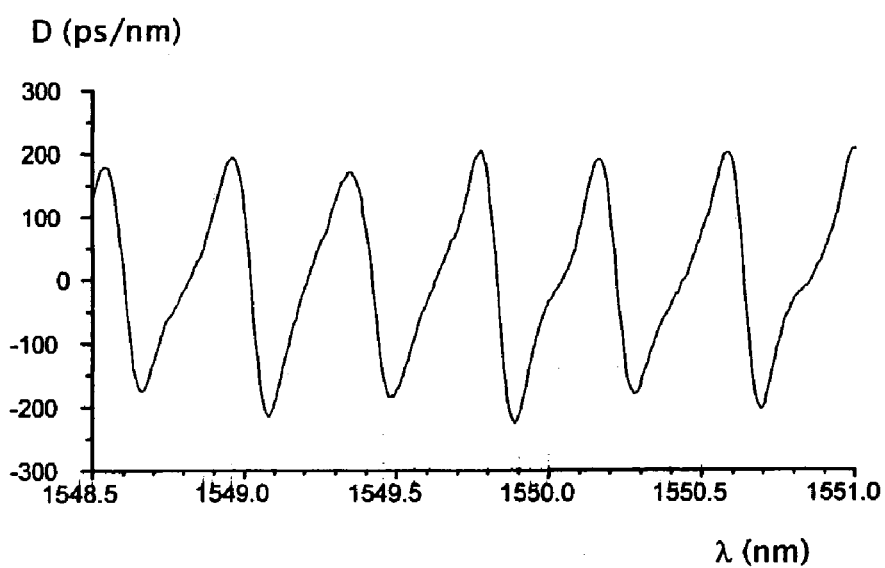
FIG. 16 shows the theoretically modelled dispersion (D) profile of the Gires-Tournois etalon of FIG. 14.
Figure 17:
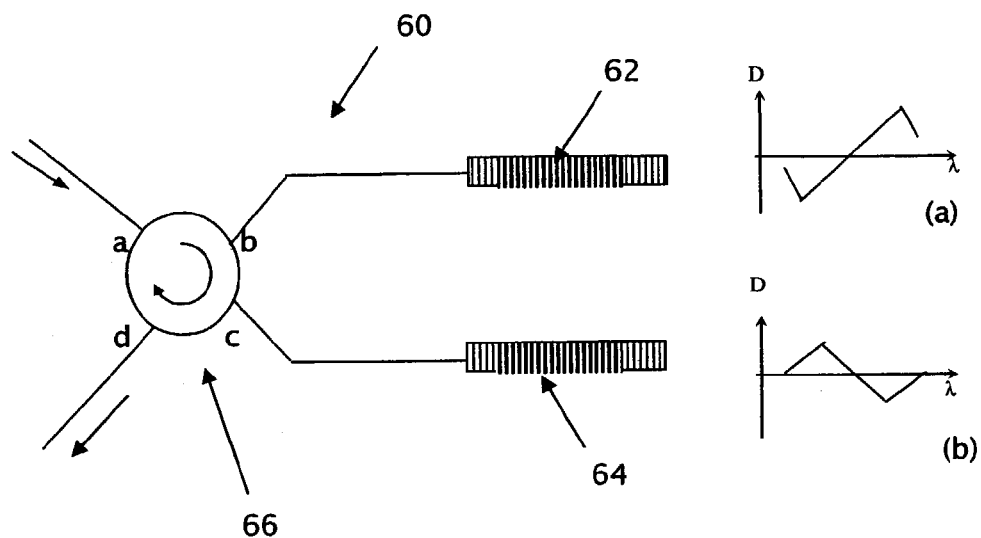
FIG. 17 is a diagrammatic representation of a dispersion compensator according to a fifth embodiment of the invention.

The grating structure is fabricated using the phase mask fabrication technique. This method of fabricating gratings will be well known to the skilled person and will therefore not be described in detail here. A chirped phase mask is used here, with a frequency doubled argon ion laser. The grating structure is fabricated using a single scan of the laser beam across the phase mask. During the scan a complex apodization function is applied to the amplitude (A) of the laser beam as a function of position (z) along the phase mask. In this example, the apodization function takes the form of a sine wave modulated super Gaussian function, as shown in FIG. 14. FIGS. 15 and 16 show the time delay (□□) response and the dispersion (D) response of the DGTE respectively.

A fifth embodiment of the present invention provides a dispersion compensator 60 as shown in FIGS. 17 to 21. The dispersion compensator 60 comprises two DGTEs 62, 64 according to the first embodiment of the invention. However, the skilled person will appreciate that one or both of the DGTEs 62, 64 may alternatively take the form of any DGTE according to the first or second aspects of the present invention, and in particular any of the above described embodiments of the invention.

The DGTEs 62, 64 have a linearly (or quasi-linearly (which is a simple method of increasing dispersion tuning ranges)) varying dispersion over a selected optical bandwidth, as can be seen in inset FIGS. 17a and 17b. The first DGTE 62 is designed to have a positive dispersion slope and the second DGTE 64 is designed to have a negative dispersion slope over the selected bandwidth. The magnitudes of the dispersion slopes of the two DGTEs 62, 64 are substantially equal, so that the dispersion compensator 60 has a constant dispersion across the selected bandwidth.

The DGTEs 62, 64 are optically coupled to one another via a four-port optical circulator 66. The first port 66a forms the input to the dispersion compensator 60, the second port 66b is coupled to the first DGTE 62, the third port 66c is coupled to the second DGTE 64, and the fourth port 66d forms the output of the dispersion compensator.

Figure 18:
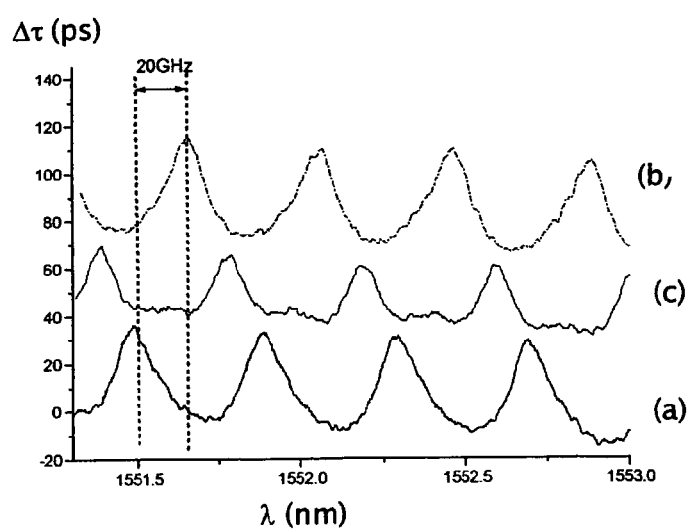
FIG. 18 shows group delay ($\Delta\tau$) profiles of the dispersion compensator of FIG. 17 for three different dispersion settings ((a) approx. −200 ps/nm, (b) approx 0 ps/nm, and (c) approx. +200 ps/nm) across four channels.

Group delay ($\Delta\tau$) profiles of the dispersion compensator 60 for three different dispersion settings ((a) approx −200 ps/nm, (b) approx. 0 ps/nm, and (c) approx. +200 ps/nm) are shown in FIG. 18. Each group delay profile displays a channel spacing of 50 GHz for four channels (ch1-4).

Figure 19:
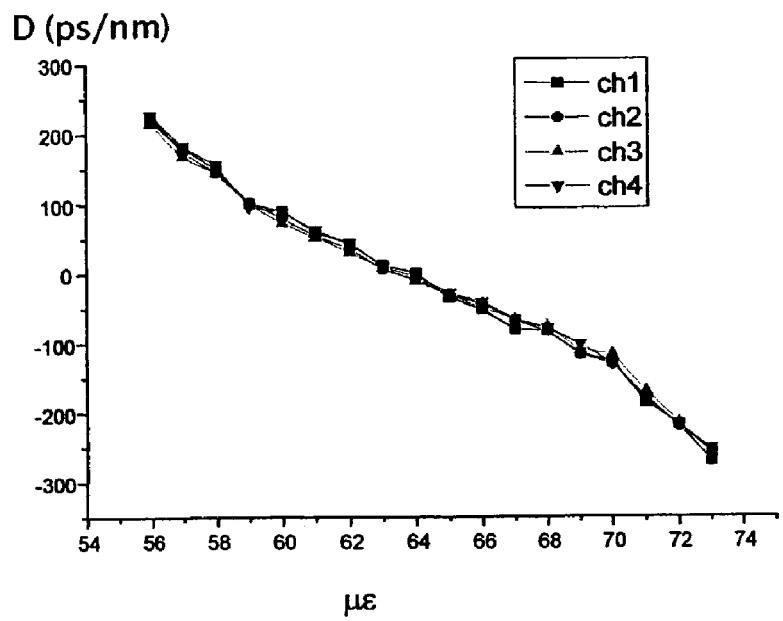
FIG. 19 shows the variation in dispersion (D) as a function of applied strain ($\mu\epsilon$) for the dispersion compensator of FIG. 17, for each of the four channels shown in FIG. 18.

The dispersion value is determined by the relative spectral shift between the two DGTEs 62, 64. The spectral shift between the two DGTEs 62, 64 can be controlled by tuning the wavelength of one or both of the chirped FBGs 26, 28 in one or both of the DGTEs 62, 64. As discussed above, the wavelength of an FBG may be tuned either by applying an axial strain to the grating or by heating the grating. In this example the magnitude of the wavelength shift between the two DGTEs 62, 64 is controlled by the application of axial strain. FIG. 19 shows the variation in dispersion (D) as a function of applied strain ($\mu\epsilon$) for each of the four channels (ch1-4).

It is evident from FIGS. 18 and 19 that the dispersion values achieved for the four channels are almost identical. The linearity of the group delay curves and of the strain tuning curves are not ideal. This is because the dispersion profile of the first DGTE 62, which has a positive dispersion slope, is quasi-linear (like FIG. 5). The linearity of the group delay profile and the strain tuning curve can be improved by using a positive-dispersion-slope DGTE which has a truly linear dispersion profile.

Figure 20:
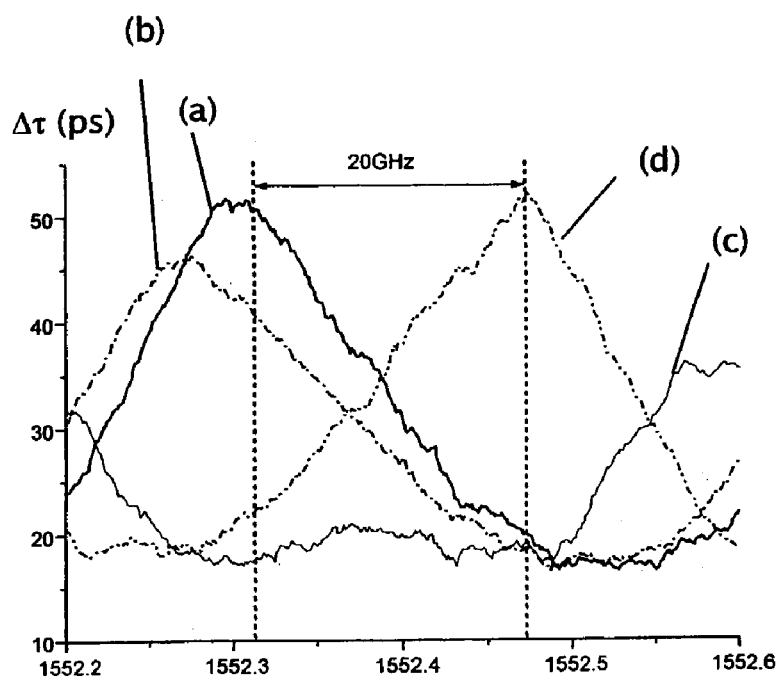
FIG. 20 shows the group delay ($\Delta\tau$) profiles, over a single channel, for four different dispersion settings ((a) approx. −210 ps/nm, (b) approx. −160 ps/nm, (c) approx. 0 ps/nm, and (d) approx. +190 ps/nm) of an improved dispersion compensator according to the fifth embodiment of the invention.
Figure 21:
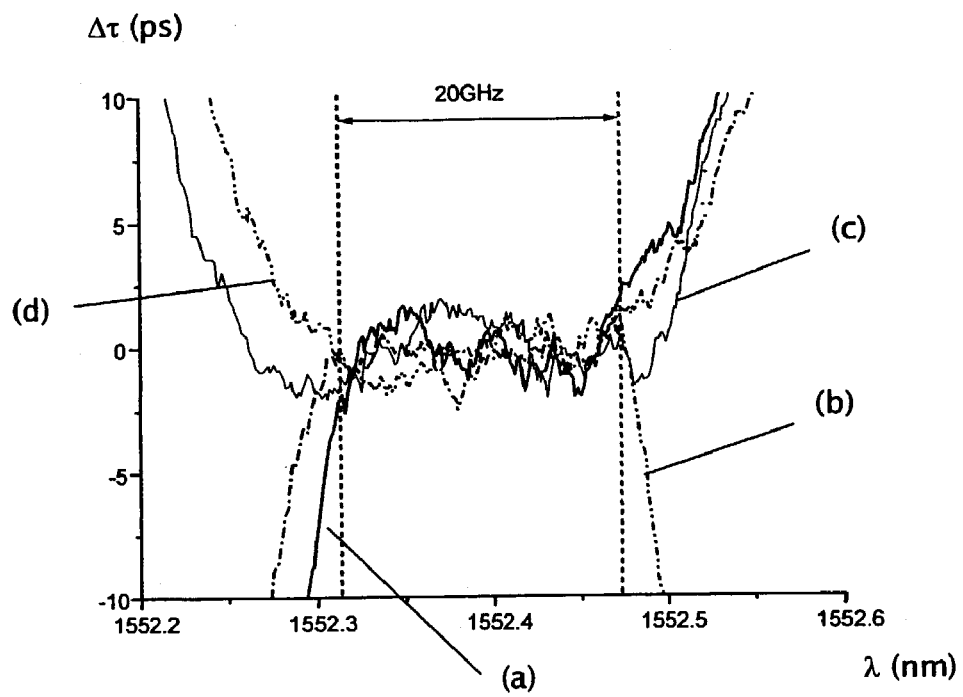
FIG. 21 shows the group delay ripples for each of the dispersion settings of FIG. 20.

FIG. 20 shows the group delay ($\Delta\tau$) profiles, over a single channel, for four different dispersion settings ((a) approx. −210 ps/nm, (b) approx. −160 ps/nm, (c) approx. 0 ps/nm, and (d) approx. +190 ps/nm) of an improved dispersion compensator 60 in which the first DGTE 62 is replace with a DGTE having a truly linear dispersion profile. As before, the dispersion compensator has a 50 GHz-channel-spacing. The improvement in the linearity of the group delay is clearly visible for each of the dispersion settings. FIG. 21 shows the group delay ripples for each of the dispersion settings. The group delay ripple is better than +/−3 ps over the full dispersion tuning and wavelength ranges.

Figure 22:
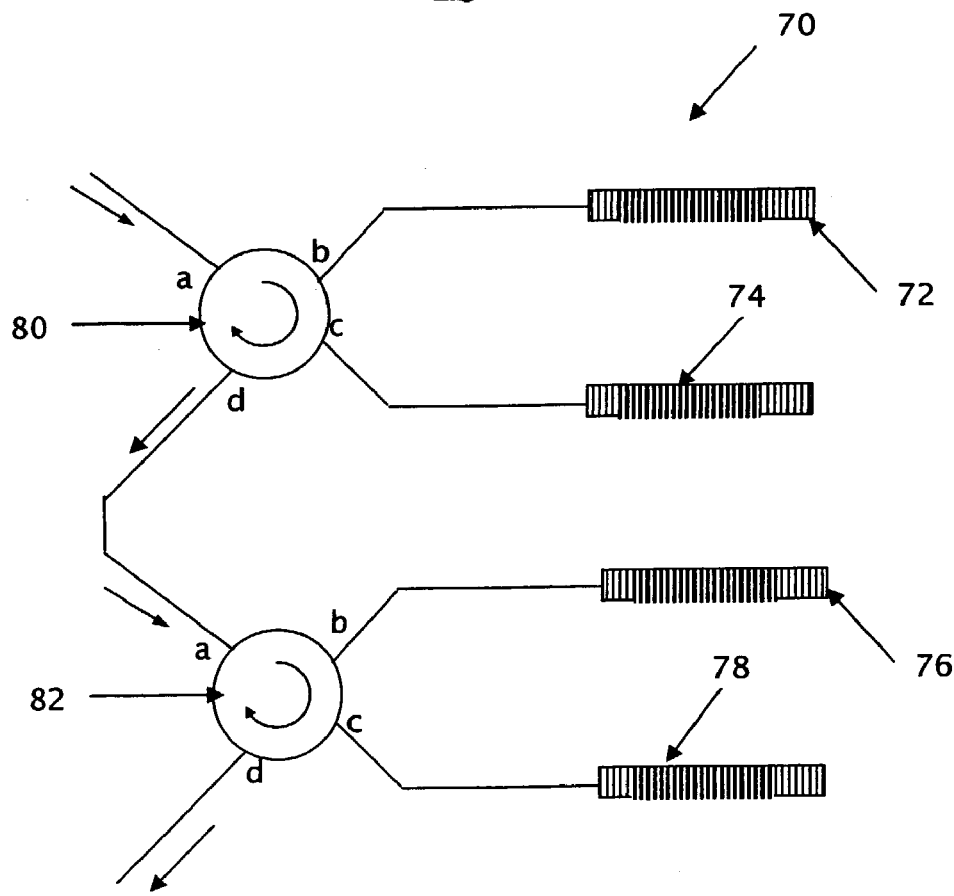
FIG. 22 is a diagrammatic representation of a dispersion compensator according to a sixth embodiment of the invention.

A dispersion compensator 70 according to a sixth embodiment of the invention is shown in FIG. 22. In this embodiment the dispersion compensator 70 comprises four DGTEs 72, 74, 76, 78 according to the first embodiment of the invention. In this example, the four DGTEs 72, 74, 76, 78 are coupled together via two four-port optical circulators 80, 82. A first port 80a of the first circulator forms the input to the dispersion compensator 70. The second port 80b and the third port 80c are connected to the first 72 and second 74 DGTEs respectively. The fourth port 80d is connected to the first port 82a of the second circulator. The second port 82b and the third port 82c of the second circulator are connected to the third 76 and fourth 78 DGTEs respectively. The remaining port 80d of the second circulator forms the output of the dispersion compensator 70. The skilled person will appreciate that the four DGTEs could be coupled together using an alternative arrangement, such as a six-port optical circulator or a combination of optical couplers.

Figure 23:
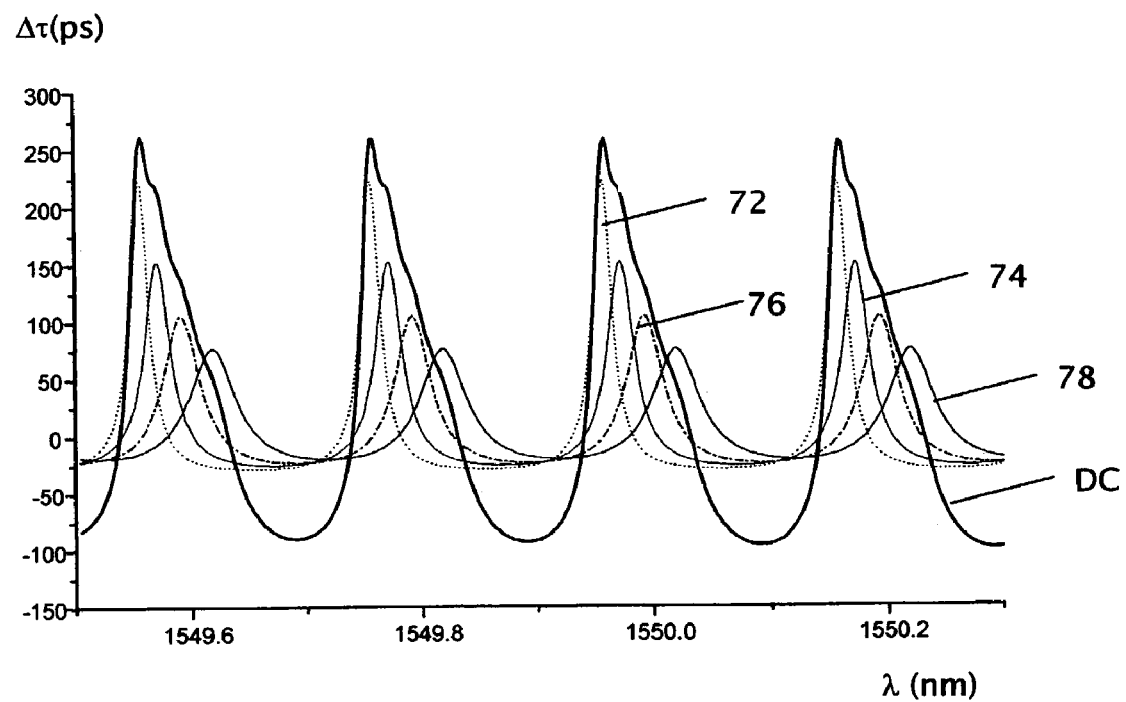
FIG. 23 shows the combined time delay profile of the dispersion compensator (DC) of FIG. 22 and the time delay ($\Delta\tau$) profiles of each of its four constituent Gires-Tournois etalons.

The time delay ($\Delta\tau$) profiles of each of the four DGTEs 72, 74, 76, 78, and the combined time delay profile of the dispersion compensator (DC) 70, are shown in FIG. 23. Only four channels are shown for clarity, but the skilled person will appreciate that such a device can provide dispersion compensation for many more channels than that. The dispersion compensator 70 can apply a dispersion of −3400 ps/nm to each optical channel, and can therefore provide the necessary dispersion compensation for a 200 km standard single mode fibre optical link within a 10 Gbit/s transmission system operating at a channel spacing of 25 GHz.

Dispersion compensators can be constructed from a combination of 2, 3, 4 or more DGTEs to provide fixed dispersion compensators or tuneable dispersion compensators. The greater the number of DGTEs combined to form a dispersion compensator, the larger the available dispersion range. In addition, a dispersion compensator can be constructed from a single DGTE. However, a single DGTE dispersion compensator will not have zero dispersion slope.

Figure 24:
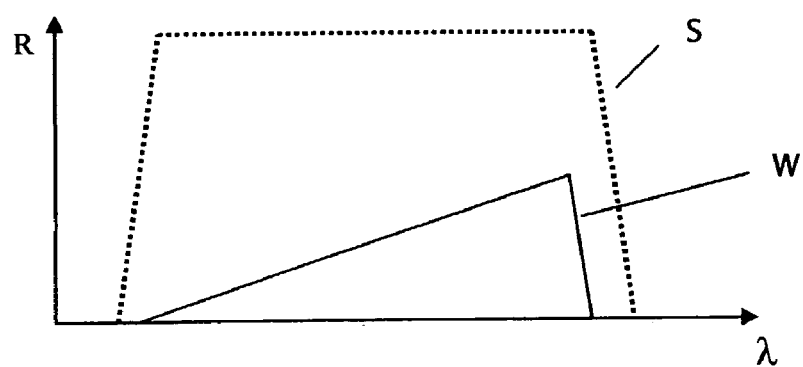
FIG. 24 shows theoretically modelled spectral profiles in reflection of a weak grating (W) and a strong grating (S) within a dispersion slope compensating Gires-Tournois etalon according to a seventh embodiment of the invention.

The fact that a single DGTE does not have zero dispersion slope can be an advantage in certain applications, since this characteristic allows a single DGTE to act as a dispersion slope compensator. A dispersion slope compensating DGTE according to a seventh embodiment of the invention is substantially the same as the DGTEs 20, 30, 40 described above, with the following modification. The reflectivity of the first (weak) grating is not constant across the operating bandwidth of the DGTE. For example, as shown in FIG. 24, for a two grating DGTE, the reflectivity (R) of the weak grating (W) increases linearly with wavelength ($\lambda$) across the operating bandwidth of the DGTE, while the reflectivity of the strong grating (S) remains substantially constant.

Figure 25:
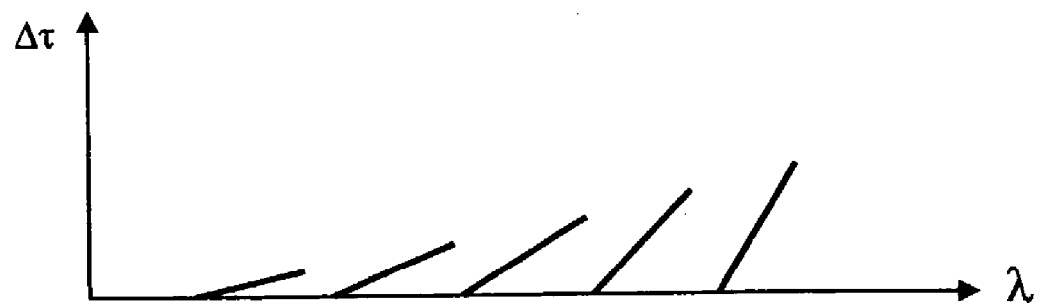
FIG. 25 shows the theoretically modelled group delay ($\Delta\tau$) profile of a dispersion slope compensator according to an eighth embodiment of the invention.
Figure 26:
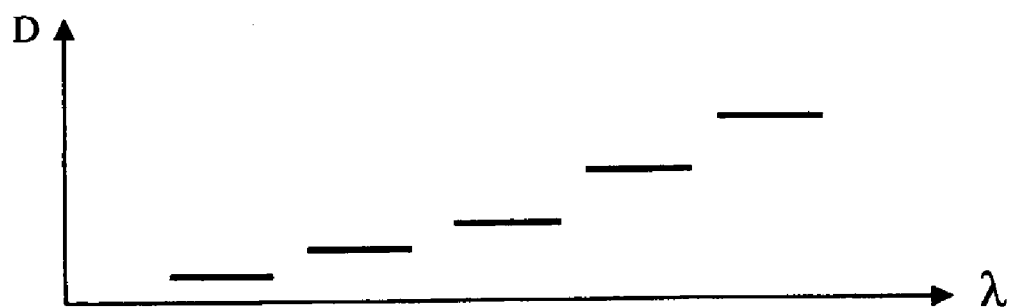
FIG. 26 shows the theoretically modelled dispersion (D) profile of the dispersion slope compensator according to the eighth embodiment of the invention.

An eighth embodiment of the invention provides a dispersion slope compensator based on two DGTEs. In this example, similarly to the dispersion slope compensator according to the seventh embodiment, the weak grating in each DGTE has a linearly varying reflectivity and the strong gratings have a substantially constant reflectivity. As shown in FIGS. 25 and 26 respectively, the time delay (Δτ) has a different gradient across each channel (five channels are shown) and each channel experiences a different dispersion (D). This type of dispersion slope compensator can therefore be used to compensate for dispersion slope across the different channels within a transmission system.

Figure 27:
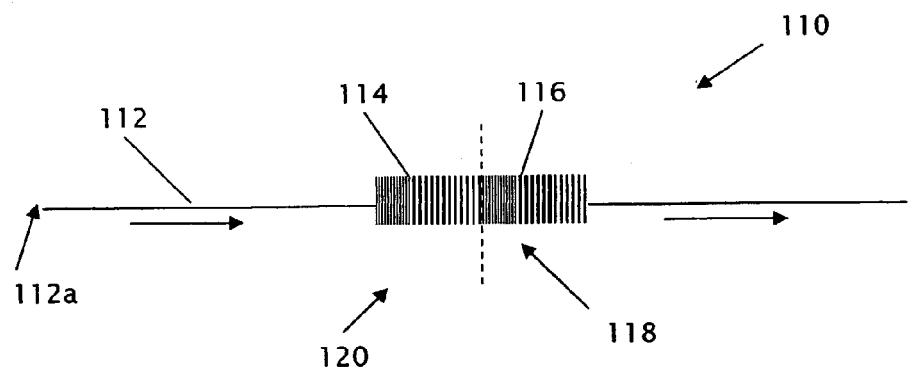
FIG. 27 is a schematic representation of an optical dispersion compensator according to a ninth embodiment of the present invention.

FIG. 27 shows a schematic representation of a ninth embodiment of the invention. The first embodiment provides a dispersion compensator 110 comprising an optical waveguide, in the form of an optical fibre 112, in which two optical waveguide gratings, chirped fibre Bragg gratings (FBGs) 114, 116 in this example, are provided in an etalon section 118 of the fibre 112, and are arranged to together define a Fabry-Perot (F-P) etalon 120.

The gratings 114, 116 may be fabricated using any suitable fabrication technique, such as the two-beam holographic fabrication technique or the phase mask fabrication technique. These grating fabrication techniques will be well known to the skilled person and so they will not be described in detail here. The spectral profiles of the gratings 114, 116 in this example are substantially the same, covering substantially the same wavelength range. The gratings 114, 116 have a length of between 1 mm and 20 mm, both gratings 114, 116 being of substantially the same length. However, if a more complex dispersion profile is required for an etalon longer gratings may be used.

In this embodiment the gratings 114, 116 are arranged adjacent to one another (the dashed line in FIG. 27 indicates the boundary between the two gratings 114, 116).

The dispersion compensator 110 of this embodiment operates in transmission, as indicated by the arrows in FIG. 27.

In operation, an optical pulse propagating through the dispersion compensator 110 is transmitted through the input section 112a of the optical fibre 112 to the etalon 118. As the skilled person will know, an optical pulse comprises a number of different wavelength components. During the interaction of the pulse with the etalon 118, the distance each wavelength component travels before exiting the etalon 118 varies according to its wavelength. A wavelength dependent delay is thereby applied to each wavelength component of the optical pulse. The interaction of the optical pulse with the etalon therefore applies dispersion to the optical pulse. On leaving the etalon 118, the optical pulse is transmitted through the output section of the optical fibre 112.

Figure 28:
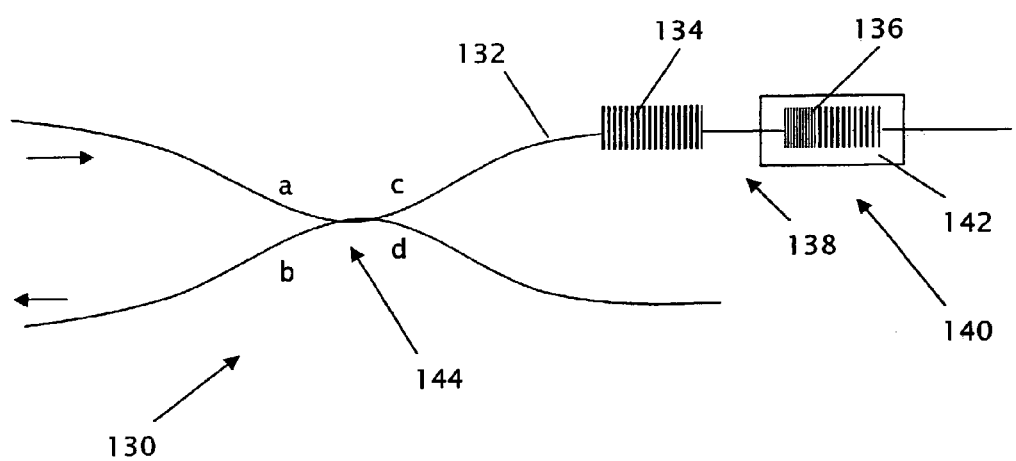
FIG. 28 is a schematic representation of an optical dispersion compensator, including an optical coupler and tuning means, according to a tenth embodiment of the present invention.

A dispersion compensator 130 according to a tenth embodiment of the invention is shown in FIG. 28. In this embodiment the dispersion compensator 130 similarly comprises an optical fibre 132 in which two FBGs 134, 136 are provided in an etalon section 138 of the fibre 132, and are arranged to together in a spaced relationship to define an F-P etalon 140.

In this example one FBG 134 is a uniform period FBG and the other FBG 136 is a chirped FBG, which may have a linear chirp or a quadratic chirp. The chirped FBG 136 is coupled to tuning means 142 operable to alter the periodicity of the FBG 136. In this example the tuning means 142 takes the form of tuning apparatus operable to apply an axial strain to the FBG 136. By changing the periodicity of the FBG 136 the amount of dispersion which may be applied to a pulse by the etalon 140 can be changed.

To enable the dispersion compensator 130 to operate in reflection the compensator 130 further comprises an optical fibre coupler 144. A first port 144a on one side of the coupler 144 forms the input to the dispersion compensator 130 and the second port 144b on that side of the coupler 144 forms the output to the dispersion compensator 130 (as indicated by the arrows in FIG. 2). One port 144c on the other side of the coupler 144 is optically coupled to the fibre 132. The fourth port 144d is not used and the fibre end should be angled or index matched to prevent unwanted reflections.

Figure 29:
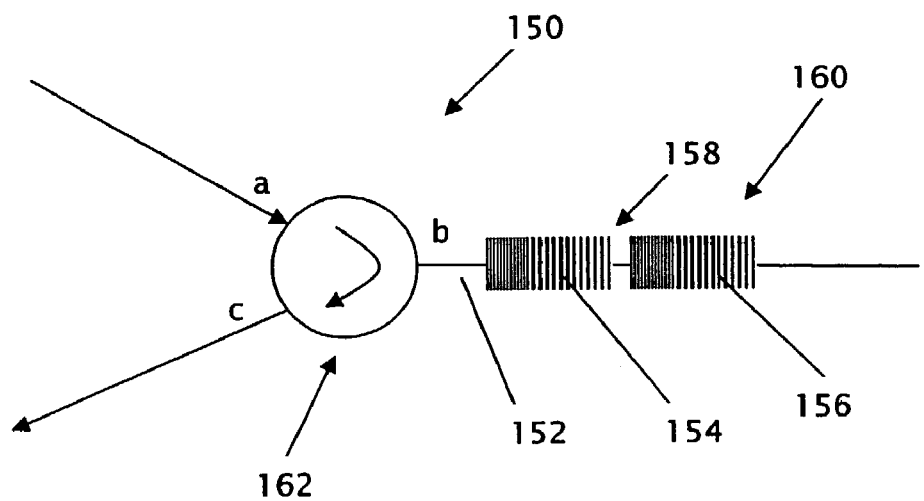
FIG. 29 is a schematic representation of an optical dispersion compensator, including an optical circulator, according to an eleventh embodiment of the present invention.

A eleventh embodiment of the invention, shown in FIG. 29., provides a dispersion compensator 150 which comprises an optical fibre 152 in which two chirped FBGs 154, 156 are provided in an etalon section 158 of the fibre 152, and are arranged together in a closely spaced relationship to define an F-P etalon 160. The chirped FBGs may both be linearly chirped, or may both be quadratically chirped or one may be linearly chirped and the other quadratically chirped.

The dispersion compensator 150 also comprises a three port optical circulator 162 to enable the compensator 150 to operate in reflection. The first port 162a forms the input to the dispersion compensator 150, the second port 162b is optically coupled to the fibre 152, and the third port 162c forms the output of the dispersion compensator 150. As indicted by the arrow within the optical circulator 162 in FIG. 29, an optical pulse entering the circulator 162 through the first port 162a is transmitted to the second port 162b from where it propagates to and interacts with the etalon 160. Exiting the etalon 160, the reflected optical pulse re-enters the circulator 162 through the second port 162b and is transmitted to the third port 162c, from which it exits the dispersion compensator 150.

The dispersion compensators 110, 130, 150 of the ninth, tenth and eleventh embodiments each have a single F-P etalon structure 120, 140, 60. Due to their nature, the dispersion applied to an optical pulse by these F-P etalons 120, 140, 160 is not the same for each wavelength component of an optical pulse. That is to say, a dispersion compensator 110, 130, 150 based on a single F-P etalon 120, 140, 160 has a dispersion slope characteristic in addition to its dispersion characteristic. This is not a problem in optical transmission systems which operate at low (less than 110 Gbit/s) optical pulse bit rates, since these transmission systems can tolerate the existence of dispersion slope across the optical bandwidth of the pulse. The average dispersion required can be set by a single F-P etalon dispersion compensator 110, 130, 150 because at low bit rates it doesn't matter if dispersion deviates a little across the spectral bandwidth of the compensator 110, 130, 150, and thus the pulse.

Figure 30:
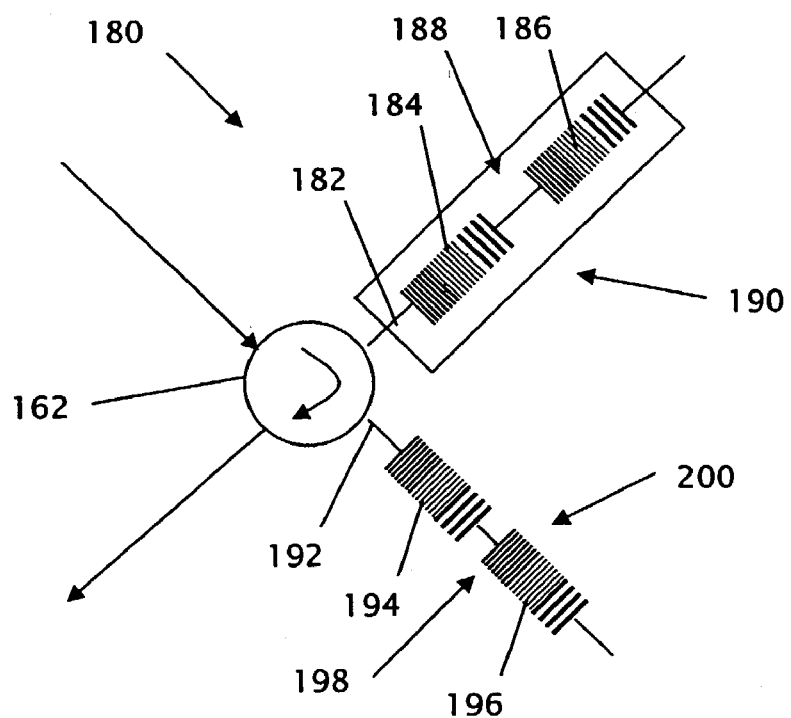
FIG. 30 is a schematic representation of an optical dispersion compensator, having two grating etalons, one being coupled to a tuning means, according to a twelfth embodiment of the present invention.

However, systems operating at higher bit rates require a dispersion compensator to display little or no dispersion slope across the optical bandwidth of a pulse. This can be achieved using the dispersion compensator 180 according to a twelfth embodiment of the invention, as shown in FIG. 30.

The dispersion compensator 180 according to this embodiment comprises two etalons 190, 200 coupled together via a four port optical circulator 162, and is constructed as follows. In a first optical fibre 182 two FBGs, which in this example are chirped FBGs 184, 186, are provided within a first etalon section 188 and are arranged in a spaced relationship to together define a first F-P etalon 190. In a second optical fibre 192 two further chirped FBGs 194, 196 are provided within a second etalon section 198 and are arranged in a closely spaced relationship to together define a second F-P etalon 200.

Figure 31:
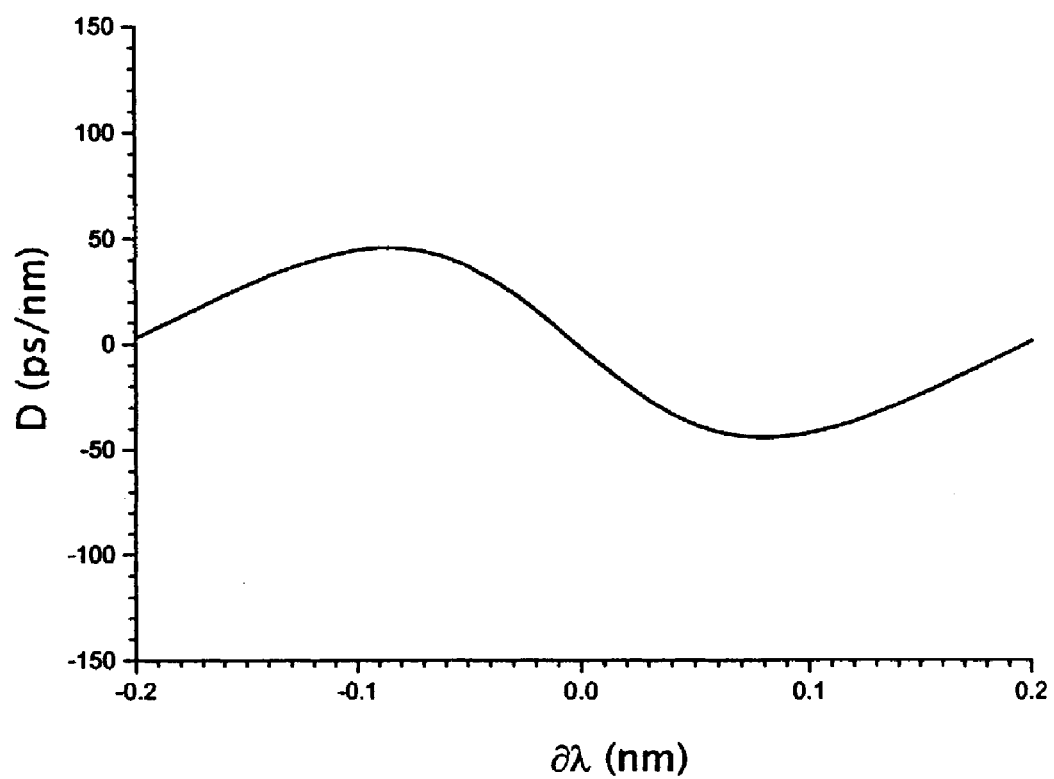
FIG. 31 shows the theoretical dispersion (D) profile of the first etalon of the dispersion compensator of FIG. 30.
Figure 32:
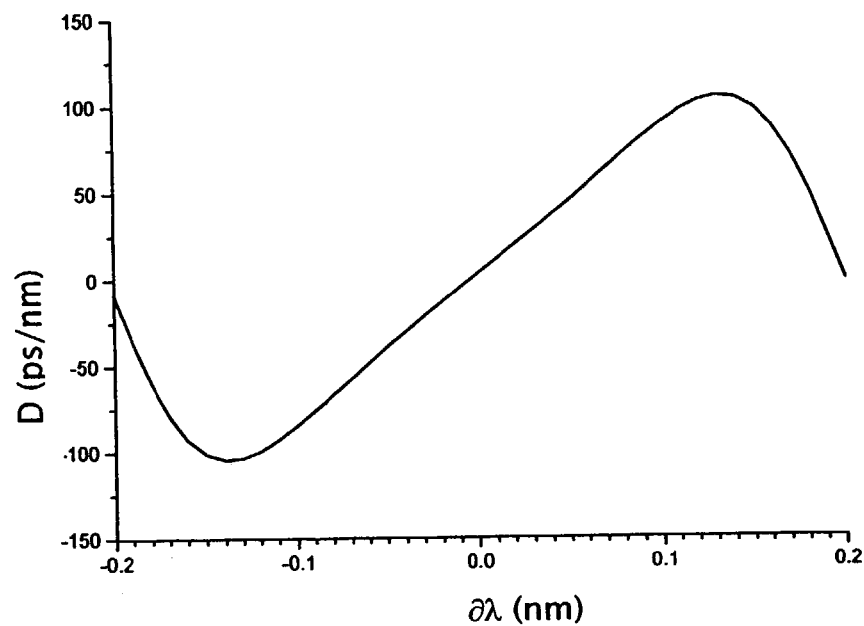
FIG. 32 shows the theoretical dispersion (D) profile of the second etalon of the dispersion compensator of FIG. 30.

The theoretical dispersion (D) profile of the first etalon 190 is shown in FIG. 31 and the theoretical dispersion (D) profile of the second etalon 200 is shown in FIG. 32. As can be seen from FIGS. 31 and 32 the dispersion profiles of the first and second etalons 190, 200 can be different.

The FBGs 184, 186, 194, 196 of the first and second etalons 190, 200 may each have the same spectral profile, giving each etalon 190, 200 the same spectral profile. Alternatively, the FBGs 184, 186 in the first etalon 190 may have the same spectral profiles and the FBGs 194, 196 in the second etalon 200 may have the same spectral profiles as each other, but different spectral profiles to the FBGs 184, 186 in the first etalon 190, thereby giving the two etalons 190, 200 different spectral profiles. At least part of the spectral profile of each etalon 190, 200 must cover the same wavelength range, including the spectral bandwidth of an optical pulse to be compensated.

Figure 33:
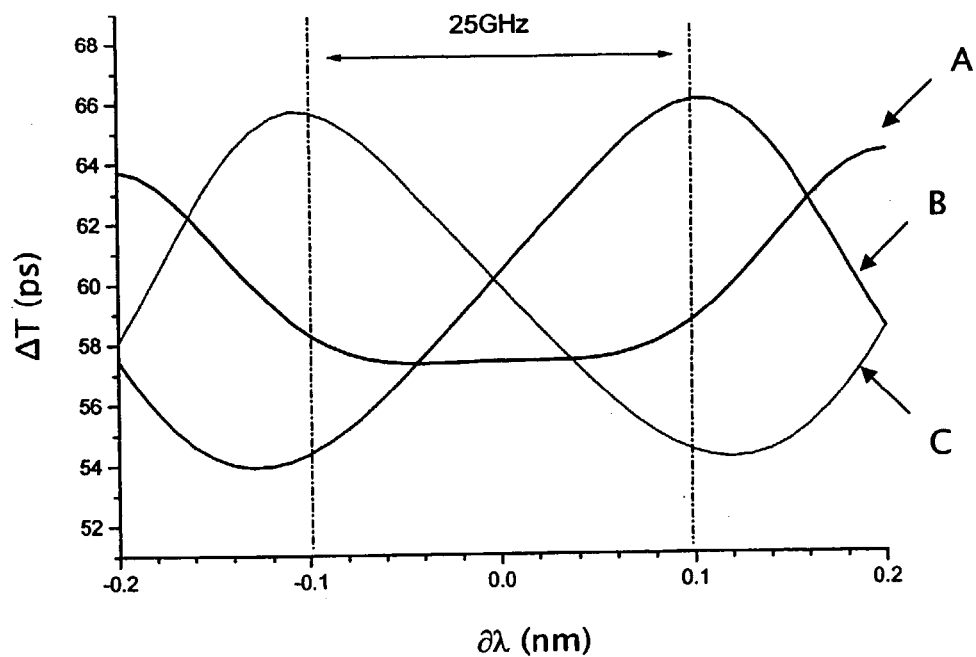
FIG. 33 shows three different theoretical resultant group delay ($\Delta T$) profiles, for three different wavelength offsets (A, B, C) between the spectral profiles of the first and second etalons, of the dispersion compensator of FIG. 30.
Figure 34:
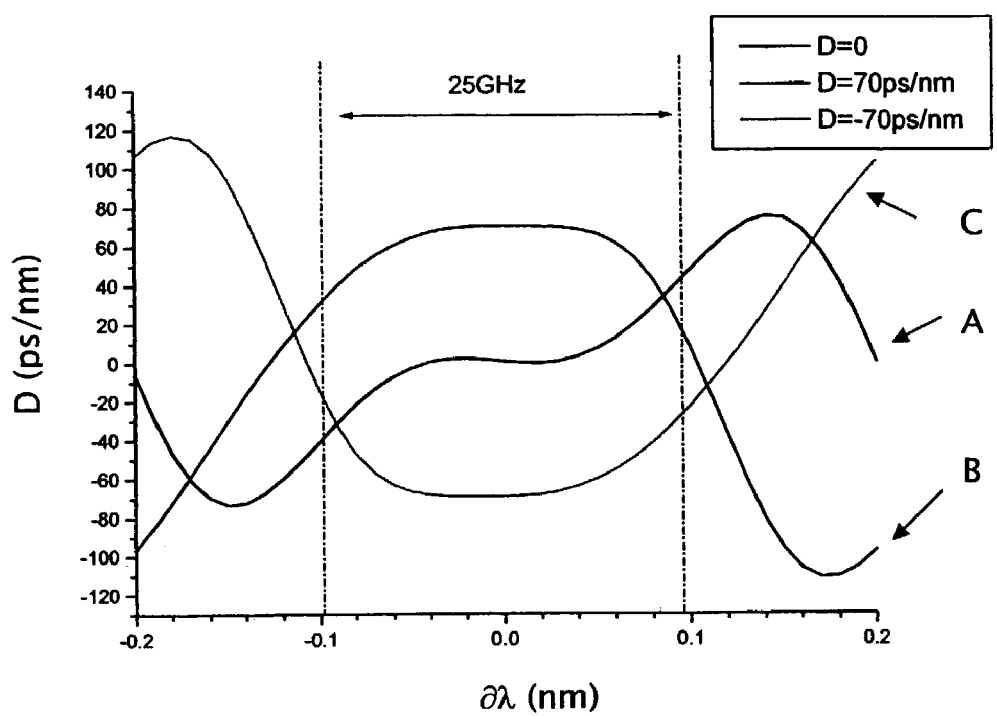
FIG. 34 shows three corresponding dispersion (D) profiles (A, B, C) calculated from the three group delay profiles of FIG. 33.

The total dispersion which may be applied to an optical pulse by the dispersion compensator 180 is equal to the sum of the dispersions applied to the pulse by each etalon 190, 200. FIG. 33 shows three different theoretical resultant group delay ($\Delta T$) profiles, for three different wavelength offsets (A, B, C) between the spectral profiles of the first 190 and second 200 etalons. FIG. 34 shows three corresponding dispersion (D) profiles (A, B, C) calculated from the three group delay profiles of FIG. 33.

In order to give the dispersion compensator 180 zero dispersion slope, the first etalon 190 must have a dispersion slope characteristic of equal magnitude but opposite sense to the dispersion slope characteristic of the second etalon. The two dispersion slopes additively cancel each other out, therefore the dispersion compensator 180 applies the same amount of dispersion to each wavelength component of an optical pulse. By concatenating two etalons in this manner the total dispersion of the dispersion compensator 180 can be increased or modified.

The dispersion compensator 180 further comprises tuning means 164 to which the FBGs 184, 186 of the first etalon 190 are coupled. The tuning means comprises tuning apparatus operable to apply an axial compression to the FBGs 184, 186, to thereby change the periodicity of the FBGs 184, 186 and thus after the amount of dispersion which may be applied to an optical pulse by the first etalon 190. The tuneability of the first etalon 190 allows the total dispersion which may be applied to an optical pulse to be altered.

The first port 162a of the circulator 162 forms the input to the dispersion compensator 180. The second port 162b of the circulator 162 is optically coupled to the first fibre 182. The third port 162c of the circulator 162 is optically coupled to the second fibre 192. The fourth port 162d of the circulator 162 forms the output of the dispersion compensator 180. As indicated by the arrow shown within the circulator 162 in FIG. 30, an optical pulse entering the dispersion compensator 180 through the first port 162a of the circulator 162 will be routed to the second port 162b and on to the first etalon 190. The reflected optical pulse re-enters the circulator through the second port 162b and is routed to the third port 162c, and on to the second etalon 200. The reflected optical pulse again re-enters the circulator trough the third port 162c and is routed to the fourth port 162d through which it exits the dispersion compensator.

Figure 35:
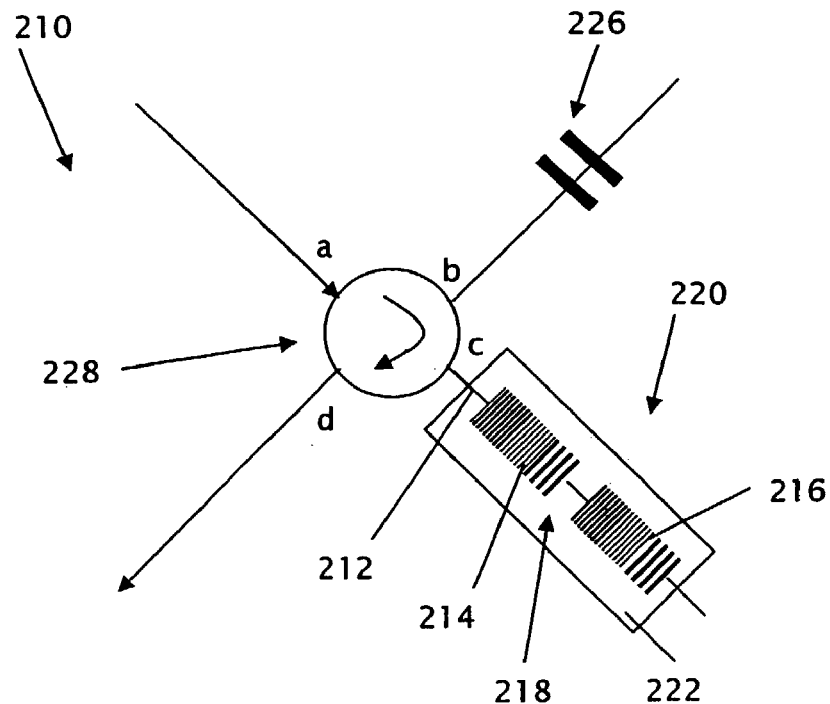
FIG. 35 is a diagrammatic representation of an optical dispersion compensator, including a Gires-Tournois etalon and a grating etalon, according to a thirteenth embodiment of the present invention.

A dispersion compensator 210 according to a thirteenth embodiment of the invention is shown in FIG. 35. In this embodiment the dispersion compensator 210 comprises an FBG etalon 220 and a bulk-optic Gires-Tournois (G-T) etalon 226 optically coupled together via a four port optical circulator 228 to enable the dispersion compensator 210 to operate in reflection. The dispersion compensator 210 is constructed as follows.

In a first optical fibre 212 two chirped FBGs 214, 216 are provided within an etalon section 218. The FBGs 214, 216 are arranged in a closely spaced relationship to together define an F-P etalon 220. The two FBGs 214, 216 are coupled to tuning means 222, which in this example takes the form of a Peltier heating device operable to alter the temperature, and thus the periodicity, of the FBGs 214, 216. The first optical fibre 212 is optically coupled to the third port 228c of the circulator 228. The GT etalon 226 is optically coupled to the second port 228b of the circulator 228 via a second optical fibre 224 by means of one or more optical lenses (not shown). The first port 228a of the circulator forms the input to the dispersion compensator 210 and the fourth port 228d of the circulator forms the output of the dispersion compensator 210.

Because the GT etalon 226 is a bulk optic device it suffers from relatively high losses due to having to couple the optical signal out of the connecting fibre 224 to launch the optical signal into the GT etalon 226, and then having to couple the reflected optical signal back into the fibre 226. However, the presence of the GT etalon 226 enables particular tuning of the profile of the dispersion compensator 210 and of the amount of dispersion which can be applied to an optical pulse. In this way the dispersion profile of the dispersion compensator 210 can be optimised, and the amount of loss kept to a minimum.

As indicated by the arrow shown within the circulator 228 in FIG. 28, an optical pulse entering the dispersion compensator 110 through the first port 228a of the circulator 228 will be routed to the second port 228b and on to the GT etalon 226. The reflected optical pulse re-enters the circulator through the second port 228b and is routed to the third port 228c, and on to the F-P etalon 220. The reflected optical pulse again re-enters the circulator through the third port 228c and is routed to the fourth port 228d through which it exits the dispersion compensator 210.

Figure 36:
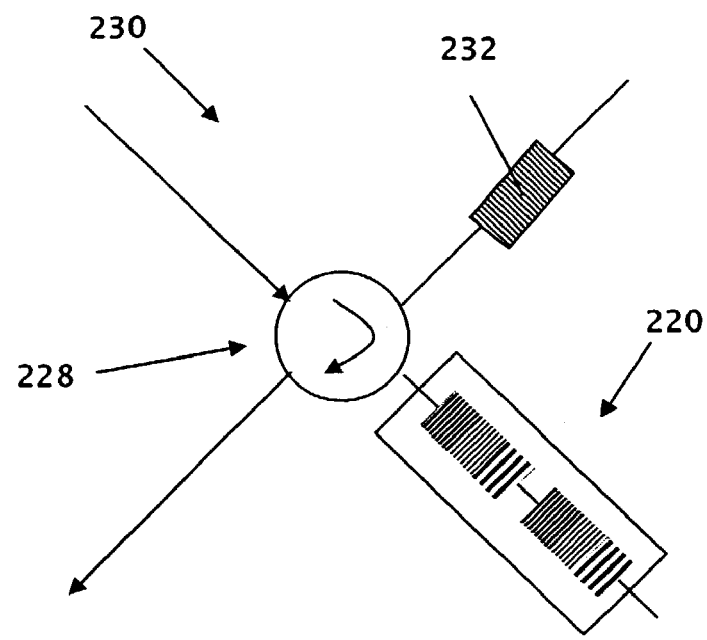
FIG. 36 is a diagrammatic representation of an optical dispersion compensator, including a chirped fibre Bragg grating, according to a fourteenth embodiment of the present invention.

FIG. 36 shows a dispersion compensator 230 according to a fourteenth embodiment of the present invention. The dispersion compensator 230 according to this embodiment is substantially the same as the dispersion compensator 210 according to the thirteenth embodiment, with the following modification. The G-T etalon 226 of the thirteenth embodiment is here replaced by a chirped FBG 232 which acts as fixed dispersion element. The dispersion which may be applied to an optical pulse by the dispersion compensator 230 is variable by means of the F-P etalon 220.

Figure 37:
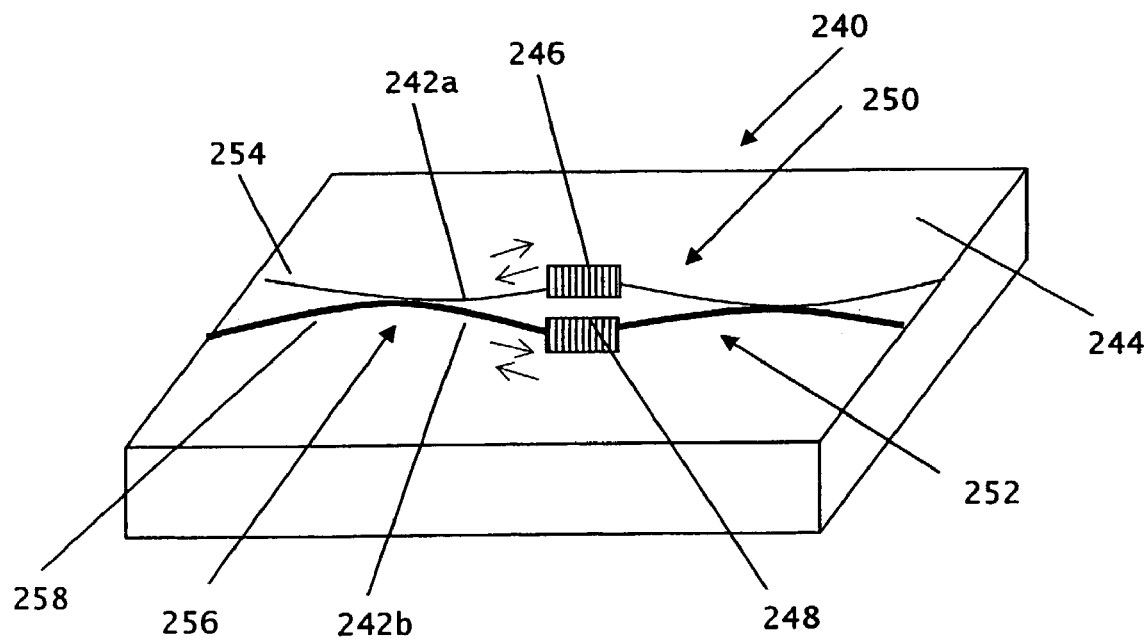
FIG. 37 is a diagrammatic representation of an optical dispersion compensator according to a fifteenth embodiment of the present invention.

A fifteenth embodiment of the invention, shown in FIG. 37, provides a dispersion compensator 240 comprising an optical waveguide, in the form of a first planar optical waveguide 242 formed within a planar substrate 244, in which two optical waveguide gratings, chirped Bragg gratings 246, 248 in this example, are provided in an etalon section 250 of the waveguide 242, and are arranged to together define an F-P etalon 252. The F-P etalon 252 is formed by the two gratings 246, 248 and the first waveguide 242.

A second planar waveguide 254 forms the input to the dispersion compensator 240 and is optically coupled to the first waveguide 242 in a coupling region 256. A third planar waveguide 258 forms the output to the dispersion compensator 240. An optical pulse to be compensated propagates through the input waveguide 254 and is coupled into a first part 242a of the first waveguide 242 as it propagates through the coupling region 256. The optical pulse is then transmitted to and reflected by (as indicated by the arrows) the first grating 246. The reflected optical pulse propagates back to the coupling region 256 where it is coupled into the second part 242b of the first waveguide 242. The pulse is then transmitted to and reflected by (as indicated by the arrows) the second grating 248. The reflected pulse propagates back to the coupling region 256 where it is coupled into the output waveguide 258.

The dispersion compensators according to the described embodiments of the invention may be used within an optical transmission system to provide post-transmission dispersion compensation or pre-transmission dispersion compensation. FIG. 38 (which does not form part of the invention) shows a transmission system 260 for providing post-transmission dispersion compensation. The system 260 comprises a transmission (TX) station 262, an optical fibre transmission link 264, a dispersion compensator 150 according to the eleventh aspect of the invention and a receive (RX) station 266. The dispersion compensator 150 imposes a dispersion on the optical pulses before they arrive at the receive station 286 to compensate for existing dispersion. FIG. 39 (which does not form part of the invention) shows a transmission system 270 for providing pre-transmission dispersion compensation. The system 270 comprises a transmission (TX) station 272, an optical fibre transmission link 274, a dispersion compensator 180 according to the twelfth aspect of the invention and a receive (RX) station 276. The dispersion compensator 180 imposes a dispersion on the optical pulses before they are transmitted across the fibre link 274 to impose a pre-chirp which is substantially equivalent to the amount of dispersion expected to be acquired by the pulses as they propagate through the fibre link 274.

The described distributed Gires-Tournois etalons and dispersion compensators provide various advantages. Since the described DGTEs are all-in-fibre devices, they are fully compatible with optical fibre based systems, such as telecommunications systems, and their insertion loss is much lower than bulk-optic GTE devices. In addition, the insertion loss can potentially be reduced to be less than that of many previously reported dispersion compensation devices. It is anticipated that the insertion loss can be controlled to be 3 dB or less by optimizing the designs of the described dispersion compensators.

Due to their all-fibre nature, both the DGTEs and the dispersion compensators described herein can be made to be very compact. The shortness of the gratings used also contributes to their compactness. The DGTEs described are therefore a highly manufacturable and low cost alternative to bulk-optic GTEs and to many known dispersion compensation devices. The shortness of the gratings within the DGTEs also gives the advantage that the DGTEs display low delay ripple. The devices can be manufactured very simply, with the gratings being fabricated at the same time or sequentially. Because the gratings are short they can be fabricated with a high degree of control. The DGTE based dispersion compensators described avoid many of the manufacturing problems which plague devices based on long grating structures, such as phase errors within the structure of the gratings and difficulties in packaging the gratings. The DGTEs and the dispersion compensators are also easily tuneable and have excellent optical characteristics.

The use of chirped gratings allows the reflection profile of a dispersion compensator to be broadened, thereby extending the number of optical channels which can be compensated for. As the chirp is increased, the total bandwidth of the dispersion compensator is correspondingly increased. The bandwidth of each optical channel is defined by the free spectral range of the DGTE(s) within the dispersion compensator, which is determined by the separation distance between the gratings forming each DGTE. The bandwidth of an optical channel can therefore be changed by suitably altering the grating separation.

The described dispersion compensators may be used to compensate a single optical channel or multiple optical channels simultaneously, since their dispersion profiles repeat periodically (the period defining the channel spacing).

The described dispersion compensators may be used to compensate one channel, for example, just before the receiver within a transmission system, or they can be used to compensate multiple channels, for example to apply a pre-chirp or to provide dispersion compensation at an intermediate location within a transmission system. In the case of multiple channels, if the gratings are linearly chirped, then all of the channels experience the same dispersion. By offsetting some of the channels, by changing the DGTE's cavity length for those channels, a dispersion compensator may also have a dispersion slope, resulting in each channel being located at a different position on the dispersion compensators dispersion curve. The dispersion compensators can therefore perform dispersion compensation and dispersion slope compensation simultaneously. The dispersion compensators may be operated as per-channel dispersion compensators or as band dispersion compensators.

The skilled person will appreciate that the described dispersion compensators may also be used as dispersion controllers, for example to perform optical pulse compression.

The dispersion compensators described provide the advantage that a single type of dispersion compensator can be used for more than one purpose, at different locations within an optical transmission system, such as telecommunications systems. This means that the number of different components in a system, and thus the number of different component spares which must be stocked, can be kept to a minimum.

The dispersion compensators may include tuning means, providing the advantage that if more dispersion is required, for example because the transmission system properties have changed, the wavelength of the dispersion compensator can be changed to move up or down its dispersion profile. The tuneability of the dispersion compensators may also prove advantageous within metro telecommunications systems where the dispersion compensators may be used as 'set and leave' dispersion elements. Various modifications may be made without departing from the scope of the present invention. As the skilled person will appreciate, each of the optical fibre based embodiments may alternatively be constructed in planar optical waveguides, and vice versa. In addition, a different type of optical fibre may be used to that described.

Where the use of chirped gratings is described, the skilled person will appreciate that other types of complex gratings, such as phase-shifted gratings or sampled gratings, may be used in their place. This includes the use of different types of complex gratings within a single DGTE.

Referring to the DGTE formed using a single complex grating structure, it will be understood that the complex grating structure may be equivalent to a different number, type and/or arrangement of gratings. Indeed, any of the described DGTEs may alternatively be fabricated in this way as a single complex grating structure.

Regarding the dispersion slope compensating DGTE, the first (weakly reflective) grating may nave a different reflectivity profile to that described.

In the dispersion compensators which utilise two or more DGTEs, the DGTEs may be provided in a different arrangement to that described and may be coupled together using different optical connections to those described.

The gratings within the F-P etalons may be chirped or uniform-period depending on the optical bandwidth across which the dispersion compensator is required to work. The combination of gratings within an F-P etalon may be different to those described The dispersion profiles of the etalons may different to those described. When an F-P etalon comprises two chirped gratings, the gratings may have the same or different rates of chirp and may be chirped in the same or opposite directions. As the skilled person will appreciate, where an optical coupler is shown this may be replaced by an optical circulator, and vice versa.

The tuning apparatus described may be replaced by an electro-optic or magneto-optic based tuning means operable to alter the effective refractive index of the material surrounding a grating.

The invention claimed is:

1. A Gires-Tournois etalon comprising:
   an optical waveguide including a grating section in which an optical waveguide grating is provided; and
   an optical reflector optically coupled to the optical waveguide and comprising a second optical waveguide grating provided within a second grating section of the optical waveguide, at least part of the spectral profile of each grating including the same wavelength range,
   the optical waveguide grating and the optical reflector being arranged to together define an etalon cavity of the Gires-Tournois etalon, wherein the optical waveguide gratings at least in part overlap one another, and
   wherein the optical waveguide grating is a weakly reflective optical waveguide grating and the second waveguide grating is a strongly reflective optical waveguide grating.

2. An etalon as claimed in claim 1, wherein the Gires-Tournois etalon further comprises one or more additional optical waveguide gratings of intermediate reflective strength, giving a total of n optical waveguide gratings,
   at least part of the spectral profile of each additional grating including the same wavelength range as the spectral profiles of the weakly reflective grating and the strongly reflective grating, and
   the gratings being arranged to together define n-1 etalon cavities.

3. An etalon as claimed in claim 2, wherein the optical waveguide gratings are selected from the group consisting of chirped Bragg gratings, phase-shifted Bragg gratings or sampled Bragg gratings.

4. A dispersion compensator comprising:
   a first Gires-Tournois etalon as claimed in claim 3,
   wherein an optical pulse propagating through the waveguide interacts with the etalon,
   the distance each wavelength component of the pulse travels before exiting the etalon varying with wavelength,
   such that a wavelength dependent delay is applied to each wavelength component, thereby applying dispersion to the pulse.

5. A dispersion compensator as claimed in claim 4, wherein the dispersion compensator further comprises a second Gires-Tournois etalon as claimed in claim 4 optically coupled to the first Gires-Tournois etalon, the first and second etalons being optically coupled together via an optical waveguide coupler or an optical waveguide circulator.

6. A dispersion compensator as claimed in claim 4, wherein the dispersion compensator further comprises one or more additional Gires-Tournois etalons as claimed in claim 4, the etalons being optically coupled together via one or more optical waveguide couplers or optical waveguide circulators.

7. A dispersion slope compensator comprising:
   a Gires-Tournois etalon as claimed in claim 3,
   the reflectivity of the weak optical waveguide grating varying across the operational bandwidth of the Gires-Tournois etalon,
   thereby giving the etalon a dispersion profile across which the dispersion slope varies as function of wavelength.

8. An etalon as claimed in claim 2, wherein the optical waveguide gratings are the same type of Bragg grating or are different types of Bragg grating.

9. An etalon as claimed in claim 2, wherein the optical waveguide gratings are selected from the group consisting of uniform period Bragg gratings, chirped Bragg gratings, phase-shifted Bragg gratings or sampled Bragg gratings.

10. A dispersion compensator comprising:
    a first Gires-Tournois etalon as claimed in claim 2,
    wherein an optical pulse propagating through the waveguide interacts with the etalon,
    the distance each wavelength component of the pulse travels before exiting the etalon varying with wavelength,
    such that a wavelength dependent delay is applied to each wavelength component, thereby applying dispersion to the pulse.

11. A dispersion compensator as claimed in claim 10, wherein the dispersion compensator further comprises a second Gires-Tournois etalon as claimed in claim 10 optically coupled to the first Gires-Tournois etalon, the first and second etalons being optically coupled together via an optical waveguide coupler or an optical waveguide circulator.

12. A dispersion compensator as claimed in claim 10, wherein the dispersion compensator further comprises one or more additional Gires-Tournois etalons as claimed in claim 10, the etalons being optically coupled together via one or more optical waveguide couplers or optical waveguide circulators.

13. A dispersion slope compensator comprising:
    a Gires-Tournois etalon as claimed in claim 2,
    the reflectivity of the weak optical waveguide grating varying across the operational bandwidth of the Gires-Tournois etalon,
    thereby giving the etalon a dispersion profile across which the dispersion slope varies as function of wavelength.

14. A dispersion slope compensator comprising:
    a Gires-Tournois etalon as claimed in claim 1,
    the reflectivity of the weakly reflective optical waveguide grating varying across the operational bandwidth of the Gires-Tournois etalon,
    thereby giving the etalon a dispersion profile across which the dispersion slope varies as function of wavelength.

15. A dispersion slope compensator as claimed in claim 14, wherein the reflectivity of the weakly reflective optical waveguide grating varies linearly as a function of wavelength.

16. A dispersion slope compensator as claimed in claim 14, wherein the reflectivity of the weakly reflective optical waveguide grating varies non-linearly as a function of wavelength.

17. An etalon as claimed in claim 1 wherein the optical waveguide gratings are selected from the group consisting of uniform period Bragg gratings, chirped Bragg gratings, phase-shifted Bragg gratings or sampled Bragg gratings.

18. An etalon as claimed in claim 17, wherein where two or more gratings are chirped Bragg gratings, the gratings are selected from the group consisting of gratings chirped in the same direction, gratings chirped in different directions, gratings having the same rate of chirp or gratings having different rates of chirp, and the chirp is selected from the group consisting of a linear chirp or a non-linear chirp, such as a quadratic chirp.

19. A dispersion compensator comprising:
a first Gires-Tournois etalon as claimed in claim 17,
wherein an optical pulse propagating through the waveguide interacts with the etalon,
the distance each wavelength component of the pulse travels before exiting the etalon varying with wavelength,
such that a wavelength dependent delay is applied to each wavelength component, thereby applying dispersion to the pulse.

20. A dispersion compensator as claimed in claim 19, wherein the dispersion compensator further comprises a second Gires-Tournois etalon as claimed in claim 19 optically coupled to the first Gires-Tournois etalon, the first and second etalons being optically coupled together via an optical waveguide coupler or an optical waveguide circulator.

21. A dispersion compensator as claimed in claim 19, wherein the dispersion compensator further comprises one or more additional Gires-Tournois etalons as claimed in claim 19, the etalons being optically coupled together via one or more optical waveguide couplers or optical waveguide circulators.

22. A dispersion slope compensator comprising:
a Gires-Tournois etalon as claimed in claim 17,
the reflectivity of a weak optical waveguide grating varying across the operational bandwidth of the Gires-Tournois etalon,
thereby giving the etalon a dispersion profile across which the dispersion slope varies as function of wavelength.

23. An etalon as claimed in claim 1, wherein the optical waveguide grating is a Bragg grating.

24. An etalon as claimed in claim 1, wherein the Gires-Tournois etalon further comprises one or more tuning means to which one or more of the optical waveguide gratings are coupled, the tuning means being operable to alter the periodicity of a grating, thereby changing the dispersion characteristics of the etalon.

25. An etalon as claimed in claim 1, wherein the optical waveguide is an optical fibre or a planar optical waveguide.

26. A Gires-Tournois etalon comprising:
an optical waveguide including an etalon section in which an optical waveguide grating structure is provided,
the optical waveguide grating structure of the Gires-Tournois etalon having a periodic refractive index variation equivalent to two or more at least partially overlapped complex Bragg gratings, a first one of the complex Bragg gratings being weakly reflective and a second one of the complex Bragg gratings being strongly reflective.

27. An etalon as claimed in claim 26, wherein the first one and second one of the complex Bragg gratings may each be selected from the group consisting of chirped Bragg gratings, phase-shifted Bragg gratings or sampled Bragg gratings.

28. An etalon as claimed in claim 27, wherein where two or more of the complex Bragg gratings are chirped Bragg gratings, the gratings are selected from the group consisting of gratings chirped in the same direction, gratings chirped in different directions, gratings having the same rate of chirp or gratings having different rates of chirp.

29. An etalon as claimed in claim 26, wherein the optical waveguide is selected from the group consisting of an optical fibre and a planar optical waveguide.

30. A dispersion compensator comprising:
a first Gires-Tournois etalon comprising: an optical waveguide including a grating section in which an optical waveguide grating is provided; and an optical reflector optically coupled to the optical waveguide and comprising a second optical waveguide grating provided within a second grating section of the optical waveguide, at least part of the spectral profile of each grating including the same wavelength range, wherein the optical waveguide grating and the optical reflector are arranged to together define an etalon cavity of the Gires-Tournois etalon, and the optical waveguide gratings at least in part overlap one another,
wherein an optical pulse propagating through the waveguide interacts with the etalon of the dispersion compensator,
the distance each wavelength component of the pulse travels before exiting the etalon varying with wavelength,
such that a wavelength dependent delay is applied to each wavelength component, thereby applying dispersion to the pulse, and
wherein the dispersion compensator further comprises a second said Gires-Tournois etalon optically coupled to the first said Gires-Tournois etalon, the first and second etalons being optically coupled together via an optical waveguide coupler or an optical waveguide circulator, and
wherein the first and second Gires-Tournois etalons are selected from the group consisting of an etalon with a first dispersion or an etalon with a second dispersion, and apply dispersion slopes of substantially equal magnitude and opposite sign, to an optical pulse propagating through the dispersion compensator, the first and second etalons thereby together applying a non-zero dispersion and a substantially zero dispersion slope to the pulse.

31. A dispersion compensator as claimed in claim 30, wherein the dispersion compensator further comprises one or more additional Gires-Tournois etalons as claimed in claim 15, the etalons being optically coupled together via one or more optical waveguide couplers or optical waveguide circulators.

32. A dispersion compensator comprising:
a first optical waveguide including a first etalon section in which first and second optical waveguide gratings are provided, the optical waveguide gratings at least in part overlapping one another,
at least part of the spectral profile of each grating including the same wavelength range, and the gratings being arranged to together define a first etalon,
wherein an optical pulse propagating through the waveguide of the dispersion compensator interacts with the etalon, the distance each wavelength component of the pulse travels before exiting the etalon varying with wavelength, such that a wavelength dependent delay is applied to each wavelength component, thereby applying dispersion to the pulse, wherein the first optical waveguide grating is a weakly reflective optical waveguide grating and the second optical waveguide grating is a strongly reflective optical waveguide grating.

* * * * *